United States Patent
Larsson et al.

(10) Patent No.: US 10,531,408 B2
(45) Date of Patent: Jan. 7, 2020

(54) SYSTEM AND METHOD PROVIDING OPTIMIZATIONS FOR REDUCED TRANSMIT POWER CONTROL FREQUENCY OPERATION

(71) Applicant: Telefonaktiebolaget LM Ericsson (publ), Stockholm (SE)

(72) Inventors: Erik Larsson, Uppsala (SE); Gerardo Agni Medina Acosta, Märsta (SE); Fredrik Ovesjö, Älvsjö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/751,946

(22) PCT Filed: Jun. 23, 2016

(86) PCT No.: PCT/SE2016/050629
§ 371 (c)(1),
(2) Date: Feb. 12, 2018

(87) PCT Pub. No.: WO2017/026935
PCT Pub. Date: Feb. 16, 2017

(65) Prior Publication Data
US 2018/0242265 A1    Aug. 23, 2018

Related U.S. Application Data

(60) Provisional application No. 62/204,130, filed on Aug. 12, 2015.

(51) Int. Cl.
*H04W 52/60* (2009.01)
*H04W 52/36* (2009.01)
(Continued)

(52) U.S. Cl.
CPC ......... *H04W 52/60* (2013.01); *H04W 52/362* (2013.01); *H04W 52/386* (2013.01);
(Continued)

(58) Field of Classification Search
CPC . H04W 52/362; H04W 52/386; H04W 52/60; H04W 52/50
(Continued)

(56) References Cited

U.S. PATENT DOCUMENTS 6,980,822 B2 *  12/2005  Conti ............... H04W 52/52
                                                    455/116
8,854,976 B2 *  10/2014  Xi ..................... H04L 5/001
                                                    370/241

(Continued)

FOREIGN PATENT DOCUMENTS

EP    2 475 108 A1    7/2012

OTHER PUBLICATIONS

3GPP TR 25.706 v13.0.0; Technical Report; 3rd Generation Partnership Project; Technical Specification Group Radio Access Network; Downlink enhancements for UMTS (Release 13)—Jun. 2015.
(Continued)

*Primary Examiner* — John J Lee
(74) *Attorney, Agent, or Firm* — Patent Portfolio Builders, PLLC

(57) ABSTRACT

A method in a radio network controller (130) is disclosed. The method comprises determining (1204) a decimation factor for a transmit power control (TPC) algorithm, the TPC algorithm comprising a power control algorithm according to which TPC commands for controlling a transmit power of a wireless device (110) are discontinuously transmitted to the wireless device by a network node (115), the decimation factor indicating a predefined number of slots, wherein one out of the predefined number of slots is
(Continued)

for transmitting a TPC command to the wireless device; upon determining the decimation factor for the TPC algorithm, modifying (1208) one or more parameters related to TPC to optimize TPC using the TPC algorithm having the determined decimation factor; and configuring (1212) the network node to control the transmit power of the wireless device according to the TPC algorithm and the one or more modified parameters.

20 Claims, 19 Drawing Sheets

(51) Int. Cl.
*H04W 52/38* (2009.01)
*H04W 52/50* (2009.01)
*H04W 76/28* (2018.01)
*H04W 52/14* (2009.01)

(52) U.S. Cl.
CPC ............ *H04W 52/50* (2013.01); *H04W 76/28* (2018.02); *H04W 52/143* (2013.01); *H04W 52/146* (2013.01)

(58) Field of Classification Search
USPC ................ 455/522, 69, 67.11, 452.1, 509
See application file for complete search history.

(56) References Cited

U.S. PATENT DOCUMENTS 9,088,940 B2* 7/2015 Marco .................. H04W 56/00
2005/0159928 A1* 7/2005 Moser .................. H04B 1/7075
702/189

OTHER PUBLICATIONS

3GPP TSG RAN WG1 Meeting #78bis; Ljubljana, Slovenia; Source: Huawei, HiSilicon; Title: Soft combining of DL TPC commands in consecutive slots (R1-144302)—Oct. 6-10, 2014.
3GPP TS 25.214 v12.3.0; Technical Specification; 3rd Generation Partnership Project; Technical Specification Group Radio Access Network; Physical layer procedures (FDD) (Release 12)—Jun. 2015.
PCT International Search Report for International application No. PCT/SE2016/050629—dated Sep. 1, 2016.
PCT Written Opinion of the International Searching Authority for International application No. PCT/SE2016/050629—dated Sep. 1, 2016.

* cited by examiner

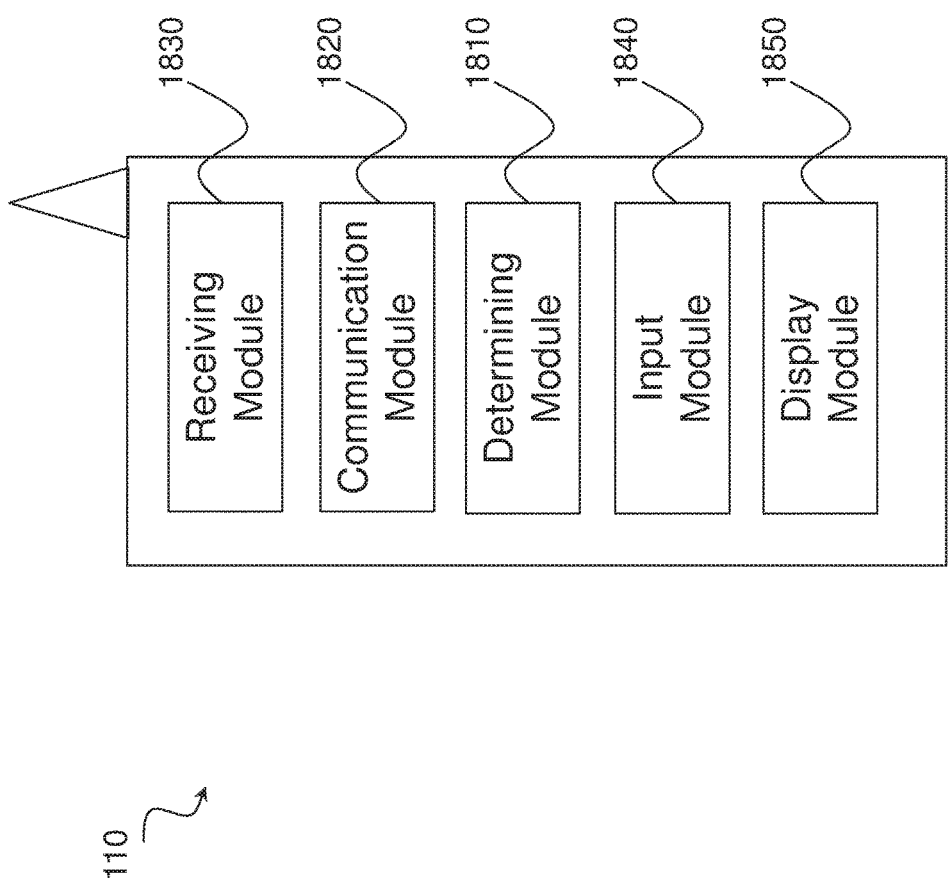

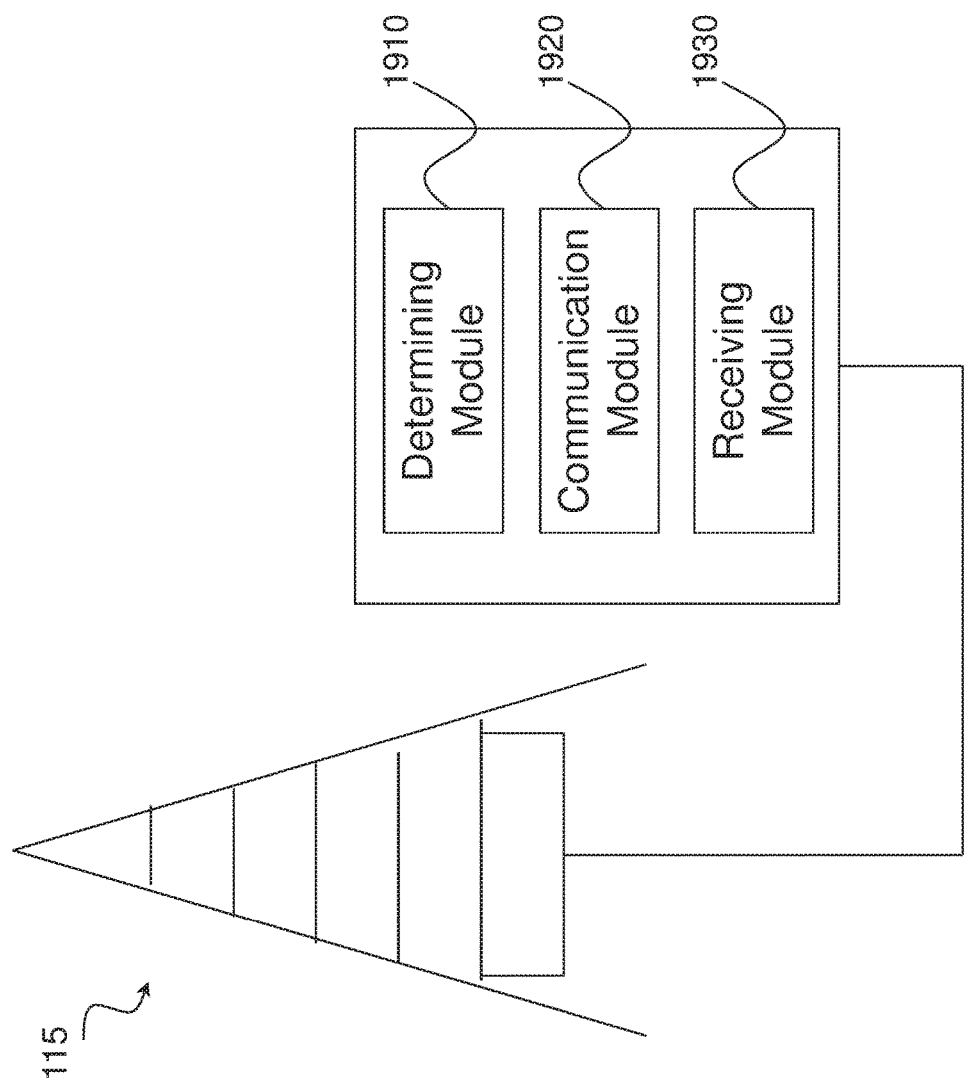

SYSTEM AND METHOD PROVIDING OPTIMIZATIONS FOR REDUCED TRANSMIT POWER CONTROL FREQUENCY OPERATION

PRIORITY

This nonprovisional application is a U.S. National Stage Filing under 35 U.S.C. § 371 of International Patent Application Serial No. PCT/SE2016/050629 filed Jun. 23, 2016, and entitled "System And Method Providing Optimizations For Reduced Transmit Power Control Frequency Operation" which claims priority to U.S. Provisional Patent Application No. 62/204,130 filed Aug. 12, 2015, both of which are hereby incorporated by reference in their entirety.

TECHNICAL FIELD

The present disclosure relates, in general, to wireless communications and, more particularly, to providing optimizations for reduced transmit power control frequency operation.

BACKGROUND

One purpose of the fractional-dedicated physical channel (F-DPCH), which was introduced in Release 6 of the 3GPP UMTS Standard (Rel 6), is to reduce the amount of downlink (DL) channelization codes used for dedicated channels. Instead of allocating one dedicated physical channel (DPCH) for the sole purpose of transmitting one power control command per slot, the F-DPCH allows up to ten wireless devices (also referred to as user equipment (UEs)) to share a single channelization code for this purpose. The F-DPCH uses a spreading factor of 256 and quadrature phase shift keying (QPSK) modulation.

FIG. 1 illustrates an example F-DPCH frame structure. The frame structure of the F-DPCH is straightforward. Each frame 5 of length 10 ms is split into 15 slots 10, where each slot consists of 2560 chips. Each slot 10 contains 10 symbols where each symbol consists of 2 channel bits. Every symbol corresponds to one transmit power control (TPC) command; bit sequence 11 represents TPC command UP and bit sequence 00 represents TPC command DOWN. Consequently, every slot 10 can carry up to 10 TPC commands and hence one F-DPCH can accommodate up to 10 wireless devices.

In the specifications, wireless devices are allocated different TPC command symbols to listen to by assigning the wireless device a certain F-DPCH channelization code, a F-DPCH frame timing, and F-DPCH slot format to listen to. The concept is illustrated by FIG. 1 and Table 1 below.

TABLE 1

| Slot Format #i | Channel Bit Rate (kbps) | Channel Symbol Rate (ksps) | SF | Bits/Slot | $N_{OFF1}$ Bits/Slot | $N_{TPC}$ Bits/Slot | $N_{OFF2}$ Bits/Slot |
|---|---|---|---|---|---|---|---|
| 0 | 3 | 1.5 | 256 | 20 | 2 | 2 | 16 |
| 1 | 3 | 1.5 | 256 | 20 | 4 | 2 | 14 |
| 2 | 3 | 1.5 | 256 | 20 | 6 | 2 | 12 |
| 3 | 3 | 1.5 | 256 | 20 | 8 | 2 | 10 |
| 4 | 3 | 1.5 | 256 | 20 | 10 | 2 | 8 |
| 5 | 3 | 1.5 | 256 | 20 | 12 | 2 | 6 |
| 6 | 3 | 1.5 | 256 | 20 | 14 | 2 | 4 |
| 7 | 3 | 1.5 | 256 | 20 | 16 | 2 | 2 |
| 8 | 3 | 1.5 | 256 | 20 | 18 | 2 | 0 |
| 9 | 3 | 1.5 | 256 | 20 | 0 | 2 | 18 |

The F-DPCH frame timing may be different for different F-DPCHs, but the offset from the primary common control physical channel (P-CCPCH) frame timing is a multiple of 256 chips (i.e., $\tau_{F-DPCH,p} = T_p \times 256$ chip, $T_p \in \{0, 1, \ldots, 149\}$). All F-DPCHs transmitted to a wireless device (i.e., UE) from the same high speed DL shared channel (HS-DSCH) cell set have the same timing.

FIG. 2 illustrates an example F-DPCH timing scheme for multiple wireless devices. As shown in FIG. 2, the radio network controller (RNC) can configure combinations of F-DPCH frame timing and F-DPCH slot formats to ensure that multiple wireless devices (i.e., UEs) are allocated different TPC symbols to use on the same F-DPCH channelization code. Specifically, FIG. 2 depicts three example combinations of F-DPCH frame timing and F-DPCH slot formats. Example combination 20 for UE1 has a frame timing of $\tau_{F-DPCH} = 0 \times 256$ chip and slot format #1. Example combination 22 for UE2 has a frame timing of $\tau_{F-DPCH} = 3 \times 256$ chip and slot format #1. Example combination 24 for UE3 has a frame timing of $\tau_{F-DPCH} = 0 \times 256$ chip and slot format #2. Thus, it can be seen from FIG. 2 that two wireless devices (i.e., UE1 and UE2) will have non-overlapping TPC commands even though they both use slot format #1, and UE1 and UE3 will have non-overlapping TPC commands even though they use the same F-DPCH frame timing.

Instead of referring to the combination of F-DPCH frame timing and F-DPCH slot format, the concept of an F-DPCH TPC symbol position may be simplified and defined. For example, there are 10 different such symbol positions, corresponding to TPC symbols transmitted every slot, with an offset from the P-CCPCH slot boundaries of k*256 chips, where k corresponds to the symbol position number and k=0, 1, . . . , 9. Hence, in the above example in FIG. 2, the F-DPCH TPC symbol positions are 2/5/3 for UE1/UE2/UE3 (example combinations 20, 22, and 24, respectively).

A wireless device (i.e., UE) is exclusively assigned a particular F-DPCH TPC symbol position on a specific F-DPCH channelization code. Two wireless devices cannot share the same symbol position on the same channelization code.

An F-DPCH carries control information generated at layer 1 (e.g., TPC commands) for one uplink (UL) dedicated physical control channel (DPCCH) associated with the F-DPCH by higher layer signaling. If dedicated physical control channel 2 (DPCCH2) is configured, an additional F-DPCH carries control information generated at layer 1 (e.g., TPC commands) for one UL DPCCH2 associated with the F-DPCH by higher layer signaling. If DPCCH2 is configured, the slot format of F-DPCH associated with the DPCCH is different from the slot format of F-DPCH associated with the DPCCH2.

In compressed frames, F-DPCH is not transmitted in DL transmission gaps given by transmission gap pattern sequences signaled by higher layers.

Approaches to reduce the TPC frequency and hence energy spent on transmitting TPC bits on F-DPCH have been proposed. One proposed approach employs discontinuous transmission (DTX) of TPC commands to reduce the control frequency. Hence, the TPC command is only transmitted in 1 out of N consecutive slots, while the other TPC commands are DTXed in the remaining N−1 slots. When the wireless device receives the transmitted TPC command, it can adjust its transmitted power accordingly, but due to the DTX, it will only apply an inner loop power control change every N slots.

FIG. 3 illustrates example TPC command transmissions on the F-DPCH. More particularly, FIG. 3 illustrates examples of how TPC commands are transmitted to one wireless device on the F-DPCH. FIG. 3 illustrates three example scenarios 30, 32, and 34. Example scenarios 32 and 34 (the two reduced frequency examples (500 Hz, N=3)) show different TPC timings depending on whether it is the first or last TPC command of the N consecutive TPC commands that shall be transmitted.

In the future, 3GPP may standardize a reduced TPC frequency solution where the last of the TPC commands in a group of N commands will actually be transmitted, where the first slot of the first group corresponds to the first slot in the F-DPCH frame. This is because the reduced power control frequency algorithm can be seen as a variant of the already specified "Algorithm 2." As stated in 3GPP TS 25.214, V12.2.0 (2015-03), section 5.1.2.2.3.1, "the UE shall process received TPC commands on a 5-slot cycle, where the sets of 5 slots shall be aligned to the frame boundaries and there shall be no overlap between each set of 5 slots."

Alternatively, 3GPP may standardize a solution where the first TPC command in the group is transmitted. In the study item 3GPP TR 25.706 V2.0.0 (2015-06), section 5.1.1.3, it is suggested to send the first TPC command in the group. Specifically, "the solution of reduced TPC frequency with DTX of TPC commands is proposed so that the TPC command is only transmitted at the first slot in every N consecutive slots, and the other TPC commands are DTXed in the remaining N−1 slots. UE can respond to the first TPC command." In any case, in 3GPP there has only been discussion on "hard-coding" which slot (out of the N slots comprising a cycle) should convey the TPC command.

In compressed frames, Transmission Gap Length (TGL) slots from $N_{first}$ to $N_{last}$ are not used for transmission of data. The particular frames that are compressed are decided by the network. When in compressed mode, compressed frames can occur periodically, or requested on demand. There is only one type of frame structure defined for DL F-DPCH compressed frames: transmission is turned off during the whole transmission gap (i.e., in slots $N_{first}$ to $N_{last}$). The maximum idle length is defined to be 7 slots per one 10 ms frame.

FIG. 4 illustrates example transmission schemes for single and double frame methods for transmission of radio frames. More particularly, FIG. 4 illustrates an example of a single-frame method for transmission of radio frames 42 and an example of a double-frame method for transmission of radio frames 44. As depicted in FIG. 4, transmission gaps 46 may be placed at different positions as appropriate for the individual purposes of inter-frequency power measurement, acquisition of control channel of other system/carrier, and actual handover operation.

The restrictions described below apply to DPCCH/DPCCH2/S-DPCCH/DPDCH in the UL and DPCH or F-DPCH in the DL.

When using the single-frame method as shown in example 42, transmission gap 46 may be located within the compressed frame depending on the TGL. When using the double-frame method as shown in example 44, transmission gap 46 is located on the center of two connected frames.

Parameters of the transmission gap positions may be calculated as follows:

TGL may be the number of consecutive idle slots during the compressed mode transmission gap. Thus,
TGL=3, 4, 5, 7, 10, 14.

$N_{first}$ may represent the starting slot of the consecutive idle slots. Thus,
$N_{first}$=0, 1, 2, 3, . . . , 14.

$N_{last}$ shows the number of the final idle slot and is calculated as follows:
If $N_{first}$+TGL≤15, then $N_{last}$=$N_{first}$+TGL−1 (in the same frame),
If $N_{first}$+TGL>15, then $N_{last}$=($N_{first}$+TGL−1) mod 15 (in the next frame)

When transmission gap 46 spans two consecutive radio frames, as in example 44, $N_{first}$ and TGL must be chosen so that at least 8 slots in each radio frame are transmitted.

In the discussion around the proposed solution of reduced power control frequency, the opportunity to let several wireless devices share the same F-DPCH TPC symbol position and channelization code, and thereby allow more than 10 UEs to fit onto the same F-DPCH code, has not been discussed. In addition, there may be negative performance impact in compressed mode from the reduced power control frequency, since not only is there no transmission of power control command during a transmission gap 46, there can also be N−1 slots before and N−1 slots after the transmission gaps where UL power control is not active (no TPC sent on F-DPCH).

In addition to the generation of TPC commands sent by the network node for controlling the UE's transmit power, another important consideration is the generation and handling of TPC commands sent by the UE for controlling the network node's transmit power. The changes that result from reduced TPC frequency operation have an impact on the generation and handling of TPC commands sent by the UE for controlling the transmit power of the network node. When the N-slot "DTX of TPC commands" algorithm is utilized there are N−1 slots in which the UE will not have any information (i.e., a Signal-to-Interference Ratio (SIR) estimate) to derive TPC commands. Also, when the algorithm "Repetition of TPC commands" is used, it is unclear if SIR estimation used to generate TPC commands should be performed on the combined symbols, or on each symbol.

SUMMARY

To address the foregoing problems with existing solutions, disclosed is a method in a radio network controller. The method comprises determining a decimation factor for a transmit power control algorithm, the transmit power control algorithm comprising a power control algorithm according to which transmit power control commands for controlling a transmit power of a wireless device are discontinuously transmitted to the wireless device by a network node, the decimation factor indicating a predefined number of slots, wherein one out of the predefined number of slots is for transmitting a transmit power control command to the wireless device. The method comprises upon determining the decimation factor for the transmit power control algorithm, modifying one or more parameters related to transmit power control to optimize transmit power control using the transmit power control algorithm having the determined decimation factor. The method comprises configuring the network node to control the transmit power of the wireless device according to the transmit power control algorithm and the one or more modified parameters.

In certain embodiments, modifying one or more parameters related to transmit power control to optimize transmit power control using the transmit power control algorithm having the determined decimation factor may comprise configuring the wireless device to toggle transmit power control commands sent to the network node to control the transmit power of the network node. Configuring the wireless device to toggle transmit power control commands sent to the network node to control the transmit power of the network node may comprise configuring the wireless device to: generate a first transmit power control command for controlling the transmit power of the network node based on one or more measurements in the one out of the predefined number of slots in which the wireless device is configured to receive a transmit power control command; and for each remaining slot out of the predefined number of slots in which the wireless device is configured to not receive a transmit power control command, generate additional transmit power control commands for controlling the transmit power of the network node according to one or more predefined rules. In certain embodiments, the one or more predefined rules may comprise: if the decimation factor indicating the predefined number of slots comprises a decimation factor of three, the wireless device shall generate and communicate to the network node in subsequent slots: a second transmit power control command instructing the network node to decrease the transmit power; and a third transmit power control command instructing the network node to increase the transmit power. In certain embodiments, the one or more predefined rules may comprise: if the decimation factor indicating the predefined number of slots comprises a decimation factor of five, the wireless device shall generate and communicate to the network node in subsequent slots: a second transmit power control command instructing the network node to decrease the transmit power; a third transmit power control command instructing the network node to increase the transmit power; a fourth transmit power control command instructing the network node to decrease the transmit power; and a fifth transmit power control command instructing the network node to increase the transmit power.

In certain embodiments, modifying one or more parameters related to transmit power control to optimize transmit power control using the transmit power control algorithm having the determined decimation factor may comprise: configuring the network node to transmit, during radio link initialization, transmit power control commands according to a predefined pattern in consecutive slots in which transmit power control symbols are known by the wireless device to be present. In some cases, modifying one or more parameters related to transmit power control to optimize transmit power control using the transmit power control algorithm having the determined decimation factor may comprise: configuring a transmit power control step size parameter such that the transmit power control step size parameter can have a value of either 1 dB or 2 dB. In certain embodiments, modifying one or more parameters related to transmit power control to optimize transmit power control using the transmit power control algorithm having the determined decimation factor may comprise: configuring the one or more wireless devices to check a synchronization status of one or more channels based on the determined decimation factor.

In certain embodiments, modifying one or more parameters related to transmit power control to optimize transmit power control using the transmit power control algorithm having the determined decimation factor may comprise: configuring the wireless device to receive a transmit power control command in one out of the predefined number of slots indicated by the decimation factor. The method may comprise configuring the wireless device to not process transmit power control commands in slots other than the one out of the predefined number of slots for which the wireless device is configured to receive a transmit power control command.

In certain embodiments, the method may comprise determining that the wireless device is configured for compressed mode such that a transmission gap interrupts a radio frame communicated to the wireless device, and applying a different transmit power control algorithm for power controlling the wireless device configured for compressed mode.

In certain embodiments, the wireless device is a first wireless device of a subset of a plurality of wireless device, and the method may comprise: configuring each wireless device of the subset of wireless devices with one of a number of possible different non-overlapping transmit power control transmission patterns; configuring the network node to transmit a transmit power control command to the first wireless device according to the configured transmit power control transmission pattern for the first wireless device; and configuring the network node to transmit a transmit power control command to a second wireless device of the subset of wireless devices according to the configured transmit power control transmission pattern for the second wireless device, wherein the first wireless device and the second wireless device share the same Transmit Power Control symbol position and channelization code conveyed within the same Fractional-Dedicated Physical Channel (F-DPCH). The transmit power control transmission pattern may comprise a different F-DPCH frame timing offset and a slot format. The subset of the one or more wireless devices may be power controlled using a transmit power control algorithm having the same decimation factor.

Also disclosed is a radio network controller. The radio network controller comprises one or more processors. The one or more processors are configured to determine a decimation factor for a transmit power control algorithm, the transmit power control algorithm comprising a power control algorithm according to which transmit power control commands for controlling a transmit power of a wireless device are discontinuously transmitted to the wireless device by a network node, the decimation factor indicating a predefined number of slots, wherein one out of the predefined number of slots is for transmitting a transmit power control command to the wireless device. The one or more processors are configured to, upon determining the decimation factor for the transmit power control algorithm, modify one or more parameters related to transmit power control to optimize transmit power control using the transmit power control algorithm having the determined decimation factor. The one or more processors are configured to configure the network node to control the transmit power of the wireless device according to the transmit power control algorithm and the one or more modified parameters.

In certain embodiments, a method in a wireless device is disclosed. The method comprises receiving, from a network node, a transmit power control command for controlling a transmit power of the wireless device, the transmit power control command received according to a transmit power control algorithm, the transmit power control algorithm comprising a power control algorithm in which transmit power control commands for controlling the transmit power of the wireless device are discontinuously transmitted to the wireless device by the network node such that the wireless device receives a transmit power control command in one out of a predefined number of slots, the predefined number of slots indicated by a decimation factor. The method comprises performing one or more operations related to transmit power control to optimize transmit power control using the transmit power control algorithm.

In certain embodiments, performing one or more operations related to transmit power control to optimize transmit power control using the transmit power control algorithm may comprise: toggling transmit power control commands sent to the network node by the wireless device to control the transmit power of the network node. Toggling transmit power control commands sent to the network node by the wireless device to control the transmit power of the network node may comprise: generating a first transmit power control command for controlling the transmit power of the network node based on one or more measurements in the one out of the predefined number of slots in which the wireless device is configured to receive a transmit power control command; and for each remaining slot out of the predefined number of slots in which the wireless device is configured to not receive a transmit power control command, generating additional transmit power control commands for controlling the transmit power of the network node according to one or more predefined rules. Generating additional transmit power control commands for controlling the transmit power of the network node according to one or more predefined rules may comprise: if the decimation factor indicating the predefined number of slots comprises a decimation factor of three, generating and communicating to the network node in subsequent slots: a second transmit power control command instructing the network node to decrease the transmit power; and a third transmit power control command instructing the network node to increase the transmit power. Generating additional transmit power control commands for controlling the transmit power of the network node according to one or more predefined rules may comprise: if the decimation factor indicating the predefined number of slots comprises a decimation factor of five, generating and communicating to the network node in subsequent slots: a second transmit power control command instructing the network node to decrease the transmit power; a third transmit power control command instructing the network node to increase the transmit power; a fourth transmit power control command instructing the network node to decrease the transmit power; and a fifth transmit power control command instructing the network node to increase the transmit power.

In certain embodiments, performing one or more operations related to transmit power control to optimize transmit power control using the transmit power control algorithm may comprise: receiving, during radio link initialization, transmit power control commands according to a predefined pattern in consecutive slots in which transmit power control symbols are known by the wireless device to be present. In certain embodiments, performing one or more operations related to transmit power control to optimize transmit power control using the transmit power control algorithm may comprise: using a transmit power control step size parameter such that the transmit power control step size parameter can have a value of either 1 dB or 2 dB. In certain embodiments, performing one or more operations related to transmit power control to optimize transmit power control using the transmit power control algorithm may comprise: checking a synchronization status of one or more channels based on the decimation factor.

In certain embodiments, the received transmit power control command is received in one out of the predefined number of slots indicated by the decimation factor. In certain embodiments, the method may comprise not processing transmit power control commands in slots other than the slot out of the predefined number of slots for which the wireless device (110) is configured to receive a transmit power control command.

In certain embodiments, the wireless device may be configured for compressed mode such that a transmission gap interrupts a radio frame communicated to the wireless device, and the method may comprise receiving subsequent transmit power control commands according to a different transmit power control algorithm for power controlling the wireless device configured for compressed mode.

In certain embodiments, the wireless device may be a first wireless device of a subset of a plurality of wireless device, and the method may comprise: determining a first transmit power control transmission pattern associated with the first wireless device, the first transmit power control transmission pattern comprising one of a number of possible different non-overlapping transmit power control transmission patterns that is different from a second transmit power control transmission pattern associated with a second wireless device included in the subset of the plurality of wireless devices; and receiving, from the network node, a transmit power control command according to the first transmit power control transmission pattern associated with the first wireless device, wherein the first wireless device and the second wireless device share the same transmit power control symbol position and channelization code conveyed within the same Fractional-Dedicated Physical Channel (F-DPCH). The first and second transmit power control transmission patterns may comprise a different F-DPCH frame timing offset and a slot format. The first wireless device and the second wireless device may be power controlled using a transmit power control algorithm have the same decimation factor.

Also disclosed is a wireless device. The wireless device comprises one or more processors. The one or more processors are configured to receive, from a network node, a transmit power control command for controlling a transmit power of the wireless device, the transmit power control command received according to a transmit power control algorithm, the transmit power control algorithm comprising a power control algorithm in which transmit power control commands for controlling the transmit power of the wireless device are discontinuously transmitted to the wireless device by the network node such that the wireless device receives a transmit power control command in one out of a predefined number of slots, the predefined number of slots indicated by a decimation factor. The one or more processors are configured to perform one or more operations related to transmit power control to optimize transmit power control using the transmit power control algorithm.

Certain embodiments of the present disclosure may provide one or more technical advantages. As one example, certain embodiments may alleviate the impact of discontinuous transmission of TPC commands on the generation and handling of TPC commands sent by the network node for controlling a transmit power of a UE (and also on the generation and handling of TPC commands sent by the UE for controlling the transmit power of the network node) by modifying one or more parameters related to transmit power control to advantageously optimize the use of TPC algorithms in which TPC commands are discontinuously transmitted to a UE. Thus, certain embodiments may advantageously make TPC procedures more robust and potentially reduce control channel overhead. As another example, certain embodiments may improve the operation of UE operating in compressed mode, which may advantageously minimize power control interruption around compressed mode transmission gaps, improve link efficiency during compressed mode operation, lower capacity cost and/or improve quality for compressed mode radio links. As another example, certain embodiments may enable more UEs to share the same F-DPCH channelization code, which may advantageously result in a need for fewer codes to be used for F-DPCH. This may advantageously leave more codes free for carrying traffic and result in an increase in capacity. As yet another example, certain embodiments may advantageously save power or increase the coverage. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 18 is a block schematic of an exemplary wireless device, in accordance with certain embodiments; and FIG. 19 is a block schematic of an exemplary network node, in accordance with certain embodiments.

DETAILED DESCRIPTION

Figure 1:
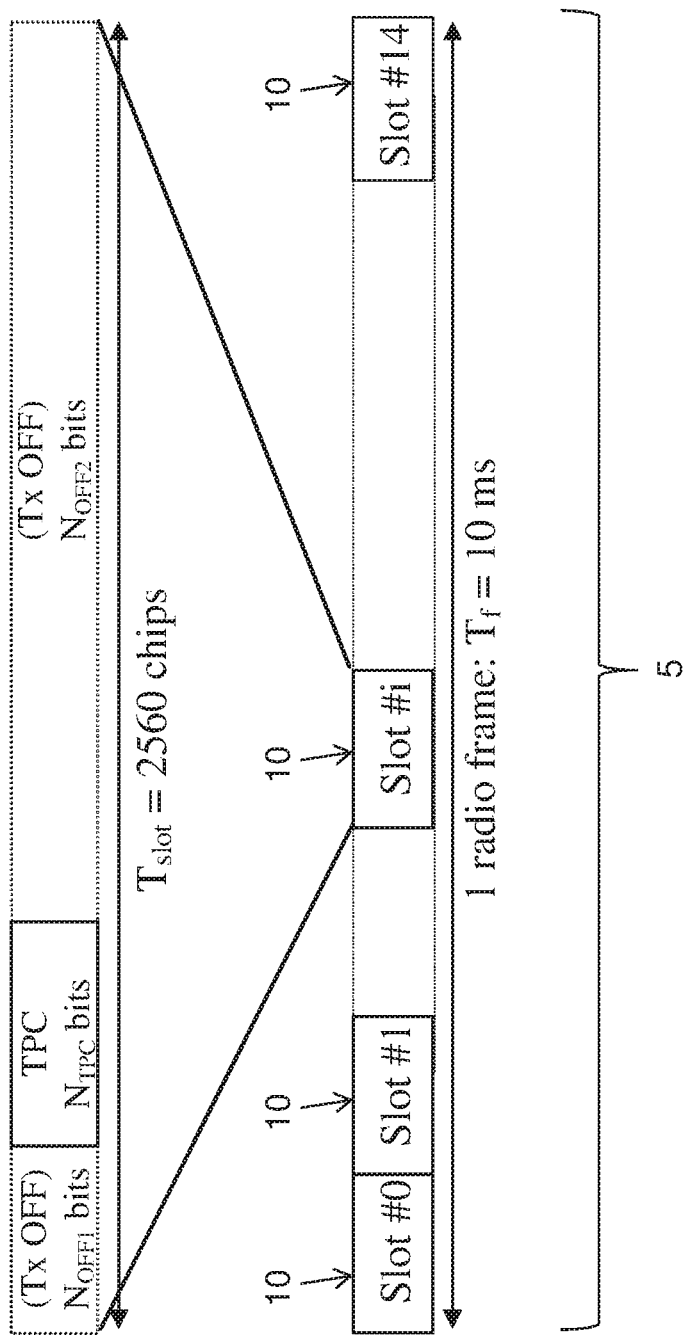
FIG. 1 illustrates an example fractional-dedicated physical channel (F-DPCH) frame structure.
Figure 2:
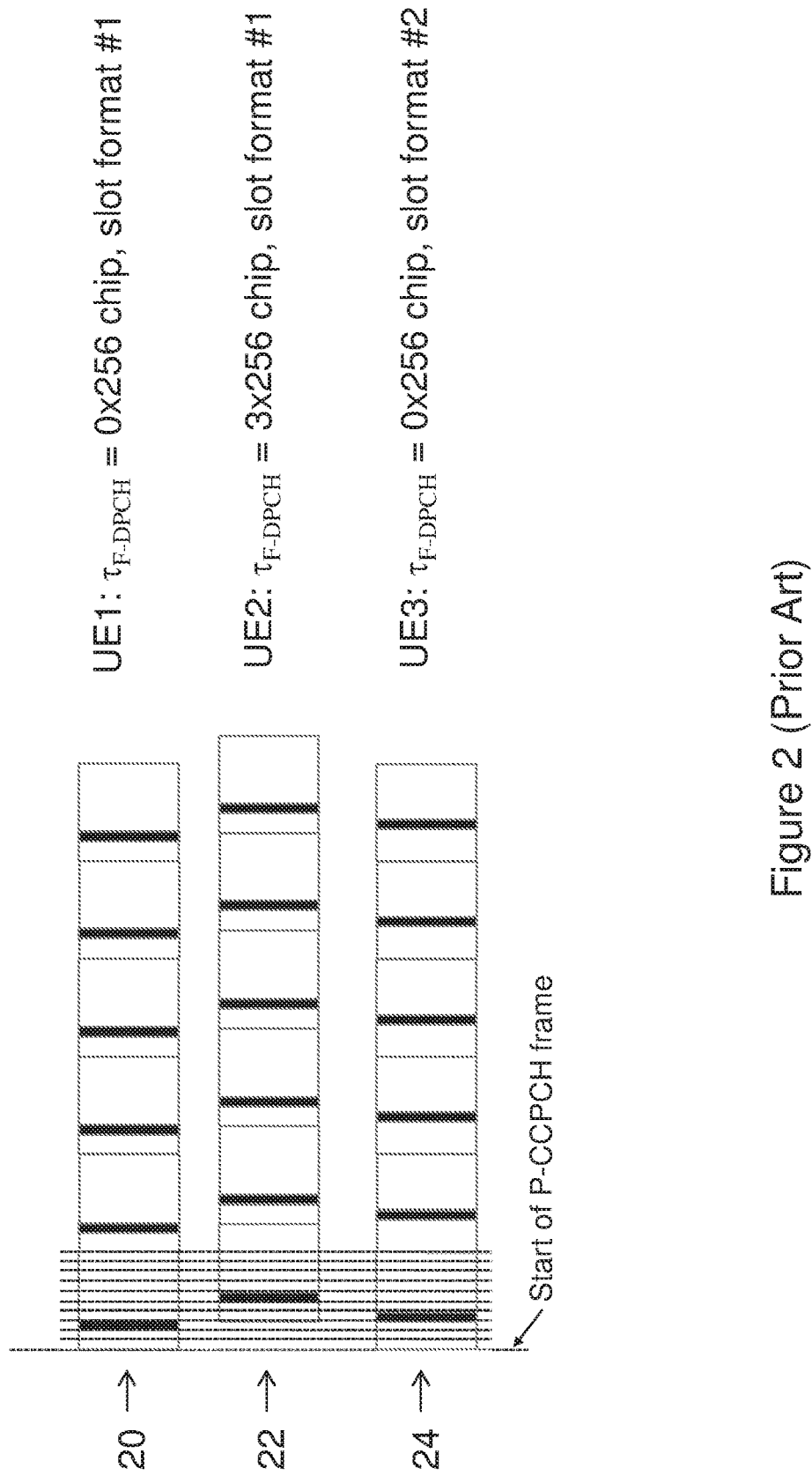
FIG. 2 illustrates an example F-DPCH timing scheme for multiple wireless devices.
Figure 3:
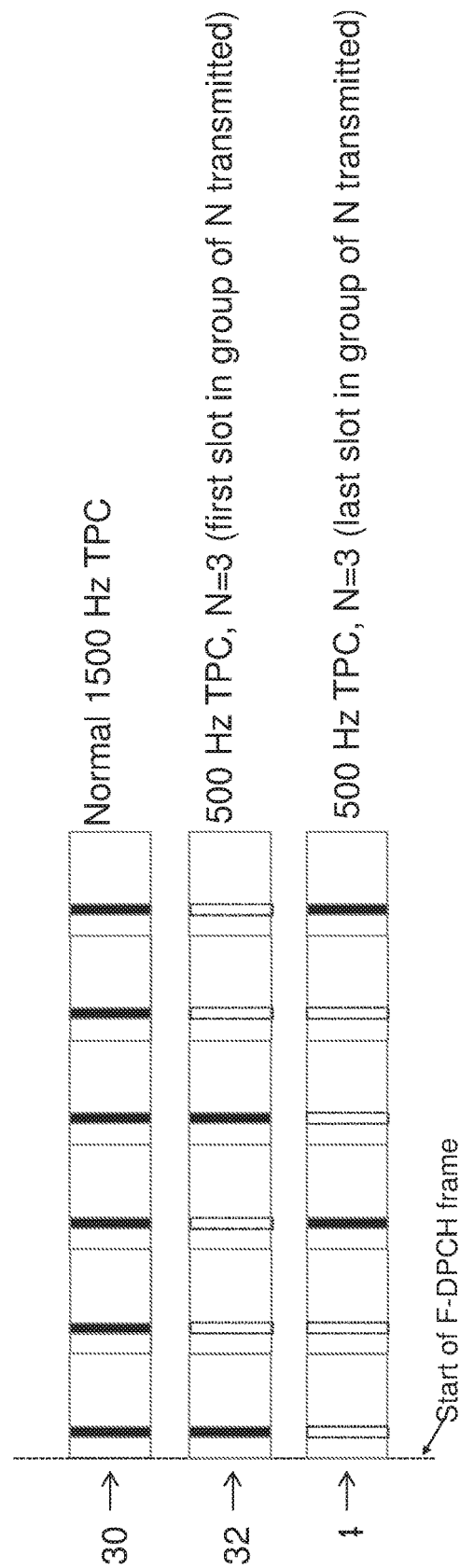
FIG. 3 illustrates example TPC command transmissions on the F-DPCH.
Figure 4:
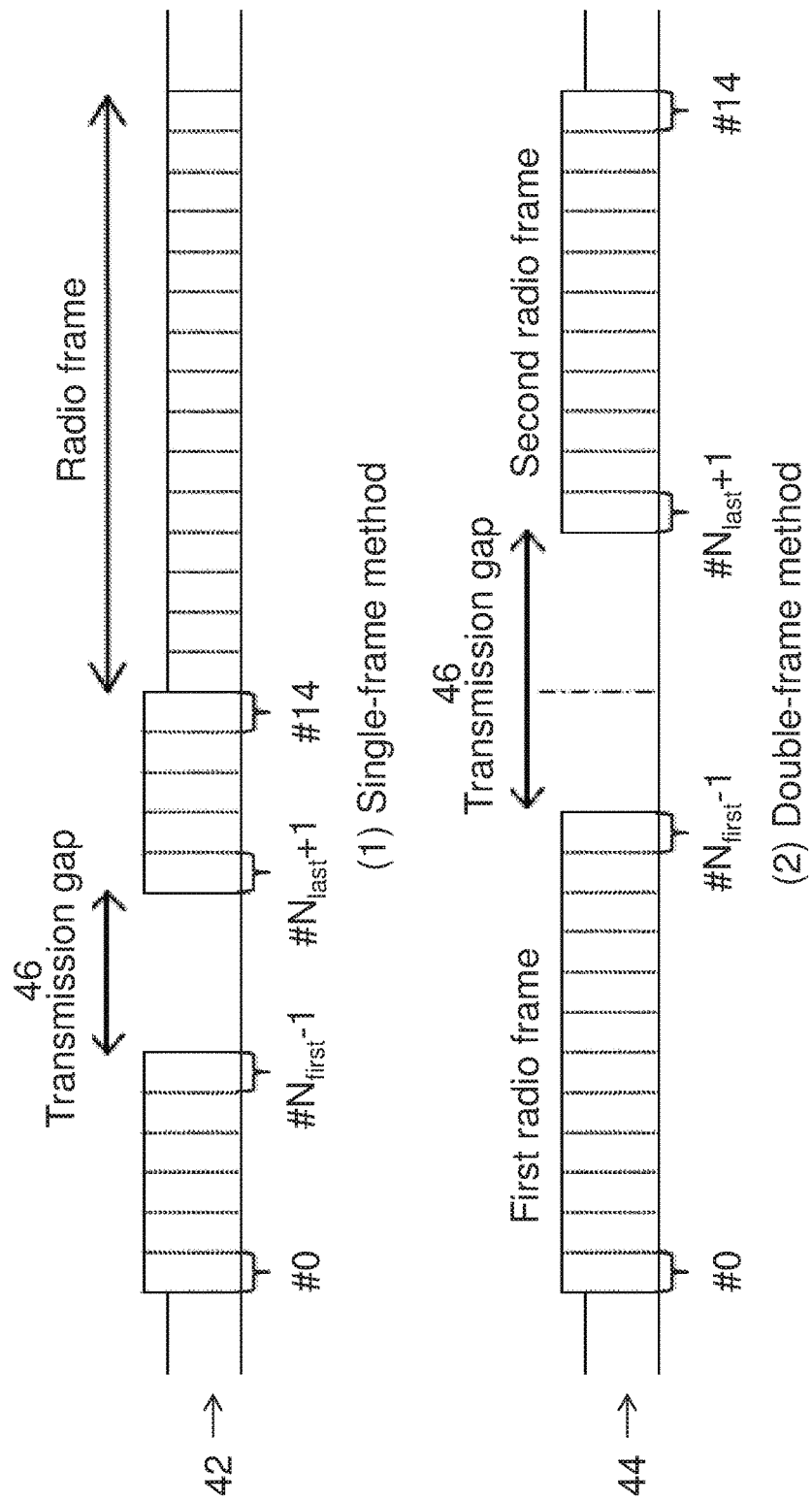
FIG. 4 illustrates example transmission schemes for single and double frame methods for transmission of radio frames.

As described above, approaches to reduce the TPC frequency and hence the energy spent on transmitting TPC bits on the F-DPCH have been proposed. One such approach involves the discontinuous transmission of TPC commands such that a TPC command is only transmitted in one out of a predefined number of consecutive slots, thereby reducing the control frequency. Reducing the control frequency in such a manner, however, has implications on a variety of operations in the network. For example, reducing the control frequency may impact not only the generation and handling of TPC commands sent by the network node for controlling a transmit power of a UE, but also the generation and handling of TPC commands sent by the UE for controlling the transmit power of the network node. Reducing the control frequency may also adversely impact UEs operating in compressed mode. In addition to improved operation when reduced control frequency is employed, the existing transmit power control process could benefit from other improvements. As described above, the capacity of the F-DPCH is limited with respect to how many UEs can share a channelization code. Thus, there is also a need to enable multiple UEs to share the same F-DPCH TPC symbol position and channelization code and thereby increase the capacity of the F-DPCH.

The present disclosure contemplates various embodiments that may address these and other deficiencies associated with existing approaches. In certain embodiments, the impact of discontinuous transmission of TPC commands on the generation and handling of TPC commands sent by the network node for controlling a transmit power of a UE (and also on the generation and handling of TPC commands sent by the UE for controlling the transmit power of the network node) may be addressed by modifications made by a radio network controller to one or more parameters related to transmit power control. The modifications to the one or more parameters related to transmit power control may advantageously optimize the use of TPC algorithms in which TPC commands are discontinuously transmitted to a UE, and may make TPC procedures more robust. Similarly, in certain embodiments, a UE may perform operations related to transmit power control to optimize the use of TPC algorithms in which TPC commands are discontinuously transmitted to the UE. These modifications and operations may advantageously make TPC procedures more robust, and potentially reduce control channel overhead. In addition, certain embodiments may address the negative impact of discontinuous transmission of TPC commands on UEs operating in compressed mode that may advantageously improve the operation of UE operating in compressed mode. For example, power control interruption may be minimized around compressed mode transmission gaps, and the link efficiency during compressed mode operation may be improved. In addition, the embodiments described herein may advantageously lower capacity cost and/or improve quality for the compressed mode radio links.

The present disclosure also contemplates certain embodiments that may address the limited capacity of the F-DPCH. In certain embodiments, the limitation on the number of UEs may be addressed by allowing several UE to use the same F-DPCH TPC symbol position and channelization code, and then time-multiplexing them by configuring different non-overlapping TPC transmission patterns. Time multiplexing multiple UEs onto the same F-DPCH TPC symbol position and channelization code may advantageously enable more UEs to share the same F-DPCH channelization code. Therefore fewer codes may need to be used for F-DPCH, which leaves more codes free for carrying traffic (such as, for example, HS packet data and speech. Such an approach may advantageously result in an increase in capacity.

According to one example embodiment a method in a radio network controller is disclosed. In certain embodiments, the method comprises determining a decimation factor for a TPC algorithm, the TPC algorithm comprising a power control algorithm according to which TPC commands for controlling a transmit power of a wireless device are discontinuously transmitted to the wireless device by a network node, the decimation factor indicating a predefined number of slots, wherein one out of the predefined number of slots is for transmitting a TPC command to the wireless device. The method comprises upon determining the decimation factor for the TPC algorithm, modifying one or more parameters related to transmit power control to optimize transmit power control using the TPC algorithm having the determined decimation factor. The method comprises configuring the network node to control the transmit power of the wireless device according to the TPC algorithm and the one or more modified parameters.

In certain embodiments, modifying one or more parameters related to transmit power control to optimize transmit power control using the TPC algorithm having the determined decimation factor may comprise: configuring the wireless device to toggle TPC commands sent to the network node to control the transmit power of the network node; configuring the network node to transmit, during radio link initialization, TPC commands according to a predefined pattern in consecutive slots in which TPC symbols are known by the wireless device to be present; configuring a TPC step size parameter such that the TPC step size parameter can have a value of either 1 dB or 2 dB; configuring the wireless device to receive a TPC command in one out of the predefined number of slots indicated by the decimation factor; configuring the one or more wireless devices to check a synchronization status of one or more channels based on the determined decimation factor.

In certain embodiments, the method comprises determining that the wireless device is configured for compressed mode such that a transmission gap interrupts a radio frame communicated to the wireless device, and applying a different TPC algorithm for power controlling the wireless device configured for compressed mode. In certain embodiments, the wireless device may be a first wireless device of a subset of a plurality of wireless device, and the method may comprise: configuring each wireless device of the subset of wireless devices with one of a number of possible different non-overlapping TPC transmission patterns; configuring the network node to transmit a TPC command to the first wireless device according to the configured TPC transmission pattern for the first wireless device; and configuring the network node to transmit a TPC command to a second wireless device of the subset of wireless devices according to the configured TPC transmission pattern for the second wireless device, wherein the first wireless device and the second wireless device share the same TPC symbol position and channelization code conveyed within the same Fractional-Dedicated Physical Channel (F-DPCH).

According to a second example embodiment a method in a wireless device is disclosed. In certain embodiment, the method comprises receiving, from a network node, a TPC command for controlling a transmit power of the wireless device, the TPC command received according to a TPC algorithm, the TPC algorithm comprising a power control algorithm in which TPC commands for controlling the transmit power of the wireless device are discontinuously transmitted to the wireless device by the network node such that the wireless device receives a TPC command in one out of a predefined number of slots, the predefined number of slots indicated by a decimation factor. The method comprises performing one or more operations related to transmit power control to optimize transmit power control using the TPC algorithm.

In certain embodiments, performing one or more operations related to transmit power control to optimize transmit power control using the TPC algorithm may comprise: toggling TPC commands sent to the network node by the wireless device to control the transmit power of the network node; receiving, during radio link initialization, TPC commands according to a predefined pattern in consecutive slots in which TPC symbols are known by the wireless device to be present; using a TPC step size parameter such that the TPC step size parameter can have a value of either 1 dB or 2 dB; checking a synchronization status of one or more channels based on the decimation factor.

In certain embodiments, the wireless device may be configured for compressed mode such that a transmission gap interrupts a radio frame communicated to the wireless device, and the method may comprise receiving subsequent TPC commands according to a different TPC algorithm for power controlling the wireless device configured for compressed mode. In certain embodiments, the wireless device may be a first wireless device of a subset of a plurality of wireless device, and the method may comprise: determining a first TPC transmission pattern associated with the first wireless device, the first TPC transmission pattern comprising one of a number of possible different non-overlapping TPC transmission patterns that is different from a second TPC transmission pattern associated with a second wireless device included in the subset of the plurality of wireless devices; and receiving, from the network node, a TPC command according to the first TPC transmission pattern associated with the first wireless device, wherein the first wireless device and the second wireless device share the same TPC symbol position and channelization code conveyed within the same Fractional-Dedicated Physical Channel (F-DPCH).

Figure 5:
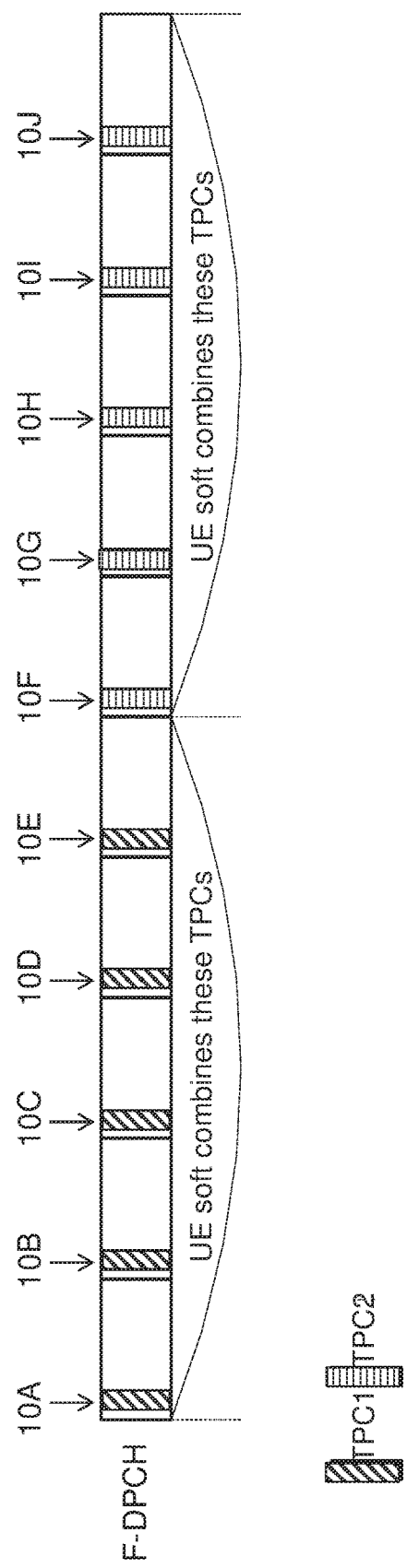
FIG. 5 illustrates an example TPC transmission scheme that uses repetition of TPC commands to reduce TPC frequency, in accordance with certain embodiments.

FIG. 5 illustrates an example TPC transmission scheme that uses repetition of TPC commands to reduce TPC frequency, in accordance with certain embodiments. More particularly, FIG. 5 illustrates an example of the "Repetition of TPC Commands" algorithm. In this candidate algorithm, an approach of reducing TPC frequency with repetition of TPC commands achieves soft combining gains. Specifically, as shown in FIG. 5, the TPC command is repeated in N consecutive slots 10 (where N is a repetition factor having a value of 5). In the example of FIG. 5, TPC command 1 is repeated in consecutive slots 10A-E, and TPC command 2 is repeated in consecutive slots 10F-10J. Wireless devices, such as wireless device 110 described above, may soft combine those N consecutive TPC commands to get the soft combining gain. For example, wireless device 110 may soft combine the consecutive TPC command 1 in slots 10A-E, and soft combine TPC command 2 in slots 10F-J.

Figure 6:
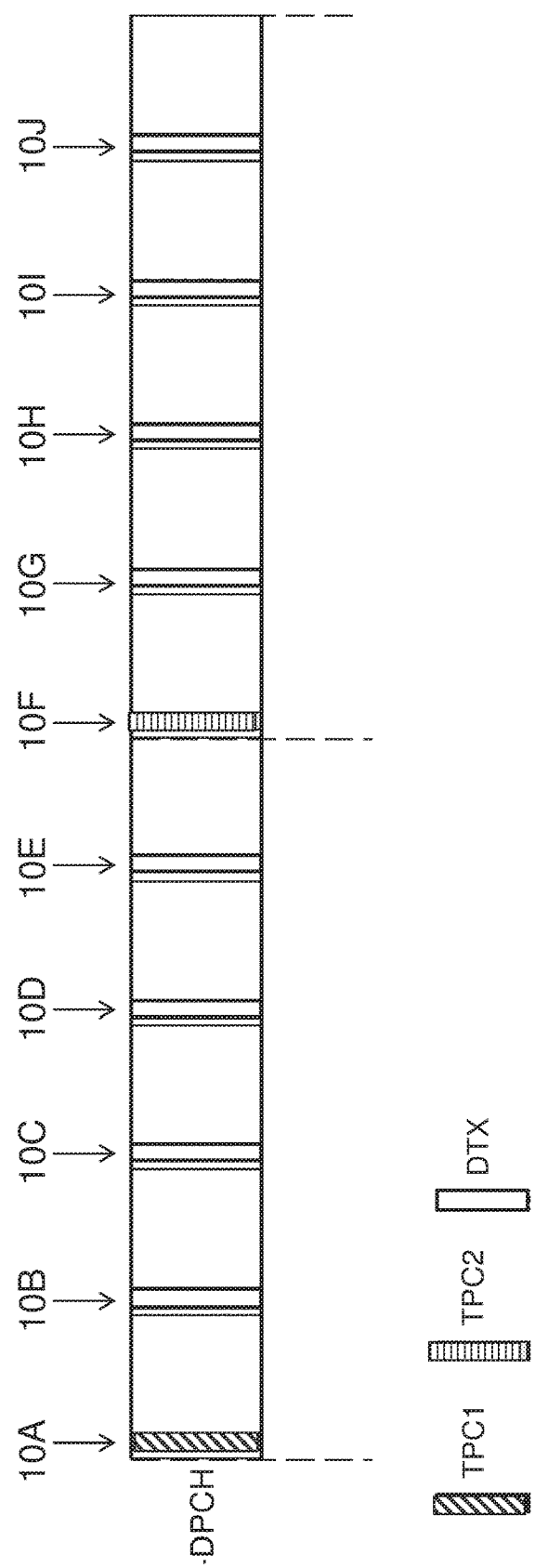
FIG. 6 illustrates another example TPC transmission scheme for reduced TPC frequency, in accordance with certain embodiments.

FIG. 6 illustrates another example TPC transmission scheme for reduced TPC frequency, in accordance with certain embodiments. In the second candidate algorithm, a solution of reducing TPC frequency with DTX of TPC commands is proposed. Specifically, as shown in FIG. 6, the TPC command is only transmitted at the first slot in every N consecutive slots, and the other TPC commands are DTXed in the remaining N−1 slots. In the example of FIG. 6, TPC command 1 is transmitted in slot 10A, and the TPC commands in slots 10B-10E are DTXed. Similarly, TPC command 2 is transmitted in slot 10F, and the TPC commands in slots 10G-10J are DTXed. Wireless device 110 may respond to the first TPC command. In FIG. 6, N is a decimation factor having a selected value of five; however, N may be selected to be any appropriate number. The decimation factor indicates the number of slots included in a slot-cycle. The decimation factor is a configurable value that may be signaled to a network node and/or wireless device, for example by a radio network controller. The decimation factor may take any suitable value. For example, in certain embodiments the decimation factor N may have the value of either 3 or 5, indicating either a 3-slot cycle or a 5-slot cycle, respectively.

Figure 7:
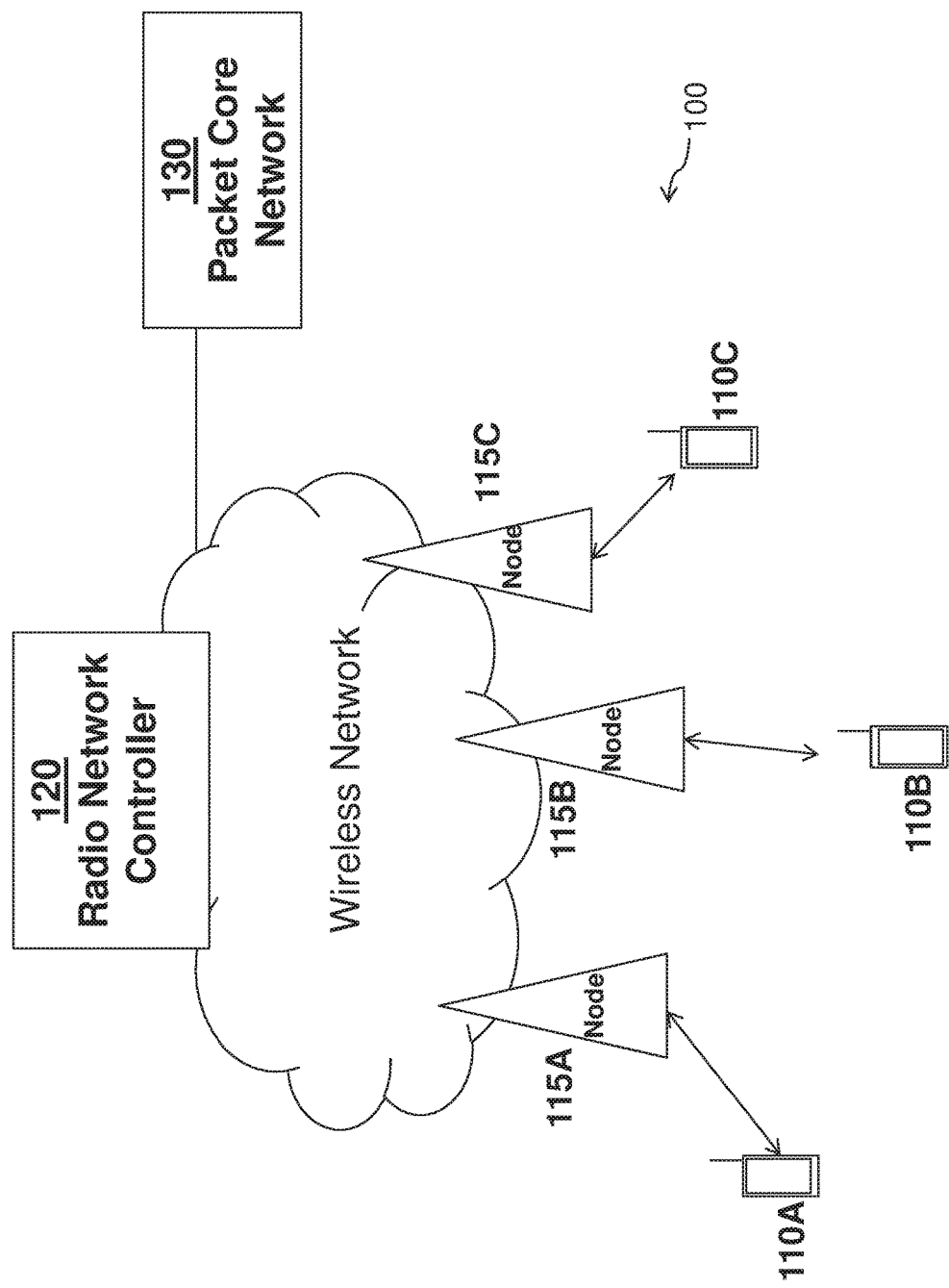
FIG. 7 is a block diagram illustrating an embodiment of a network, in accordance with certain embodiments.

FIG. 7 is a block diagram illustrating an embodiment of a network 100, in accordance with certain embodiments. Network 100 includes one or more UE(s) 110 (which may be interchangeably referred to as wireless devices 110), one or more network node(s) 115 (which may be interchangeably referred to as eNBs 115), radio network controller 120, and core network nodes 130. Wireless device 110 may communicate with network nodes 115 over a wireless interface. For example, a wireless device 110 may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, UEs 110 may have device-to-device (D2D) capability. Thus, UEs 110 may be able to receive signals from and/or transmit signals directly to another UE.

Radio network node 115 may interface with radio network controller 120. Radio network controller 120 may control radio network node 115 and may provide certain radio resource management functions, mobility management functions, and/or other suitable functions. In certain embodiments, the functions of the radio network controller 120 may be included in network node 115. Radio network controller 120 may interface with core network node 130. In certain embodiments, radio network controller 120 may interface with core network node 130 via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, core network node 130 may manage the establishment of communication sessions and various other functionality for wireless devices 110. Wireless device 110 may exchange certain signals with core network node 130 using the non-access stratum layer. In non-access stratum signaling, signals between wireless device 110 and core network node 130 may be transparently passed through the radio access network. In certain embodiments, network nodes 115 may interface with one or more network nodes over an internode interface, such as, for example, an X2 interface.

As described above, example embodiments of network 100 may include one or more wireless devices 110, and one or more different types of network nodes capable of communicating (directly or indirectly) with wireless devices 110. Examples of the network nodes include radio network nodes 115, 120, and core network nodes 130. The network may also include any additional elements suitable to support communication between wireless devices 110 or between a wireless device 110 and another communication device (such as a landline telephone). Each of wireless device 110, radio network node 115, radio network controller 120, and core network node 130 may include any suitable combination of hardware and/or software. Examples of particular embodiments of wireless device 110, radio network node 115, and network nodes (such as radio network controller 120 or core network node 130) are described with respect to FIGS. 14-19 below.

The terms wireless device 110 and network node 115, as used herein, are considered general terms and are intended to be considered as non-limiting. For example, "network node" may correspond to any type of radio network node or any network node, which communicates with wireless device 110 and/or another network node 115. Examples of network nodes 115 may include but are not limited to Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT etc. Additionally, "wireless device" may be used interchangeably with user equipment (UE) and may refer to any type of wireless device communicating with a network node 115 and/or with another wireless device 110 in a cellular or mobile communication system. Examples of wireless devices 110 include target device, device to device (D2D) UE, machine type UE or UE capable of machine to machine (M2M) communication, PDA, iPAD, Tablet, mobile terminals, smart phone, laptop embedded equipped (LEE), laptop mounted equipment (LME), USB dongles, or any other suitable wireless devices.

Although FIG. 7 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in a Long Term Evolution (LTE) network, the embodiments may be implemented in any appropriate type of telecommunication system supporting any suitable communication standards (including 5G standards) and using any suitable components, and are applicable to any radio access technology (RAT) or multi-RAT systems in which a UE receives and/or transmits signals (e.g., data). For example, the various embodiments described herein may be applicable to LTE, LTE-Advanced, 5G, UMTS, HSPA, GSM, cdma2000, WCDMA, WiMax, UMB, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink.

As described above, there is a need for optimization of reduced TPC frequency operation, both with respect to the generation and handling of TPC commands sent by the network node for controlling a transmit power of a UE, and for the generation and handling of TPC commands sent by the UE for controlling the transmit power of the network node. There is also a need for a new approach to handling UEs operating in compressed mode, and for enabling multiple UEs to share the same F-DPCH TPC symbol position and channelization code.

In certain embodiments, radio network controller 120 is responsible for the selection of the F-DPCH frame timing and slot format for the transmission of TPC commands. As part of the 3GPP Release 13, a study on downlink enhancements for UMTS was performed (RP-141657). Within the area of expertise of the TSG RAN WG1, the study item description (SID) included the possibility of introducing a new algorithm for processing TPC commands sent on DL. As described above, from investigations performed during the study item phase, two candidate algorithms for processing TPC commands were derived (RP-150682).

In addition to the generation of TPC commands sent by network node 115 for controlling the transmit power of wireless device 110, another consideration is the generation and handling of TPC commands sent by wireless device 110 for controlling the transmit power of network node 115. By changing the generation of TPC commands sent by network node 115 for controlling the transmit power of wireless device 110, there is an impact on the generation and handling of TPC commands sent by wireless device 110 for controlling the transmit power of network node 115. When the N-slot "DTX of TPC commands" algorithm is utilized there are N−1 slots in which wireless device 110 will not have any information (i.e., a SIR estimate) to derive TPC commands. Also, when the algorithm "Repetition of TPC commands" is used, it is unclear if SIR estimation used to generate TPC commands should be performed on the combined symbols, or on each symbol. The various embodiments described herein address these and other considerations related to optimizing reduced frequency TPC operation.

In certain embodiments, radio network controller 120 may determine a decimation factor for a TPC algorithm. The TPC algorithm may comprise a power control algorithm according to which TPC commands for controlling a transmit power of a wireless device 110 are discontinuously transmitted to wireless device 110 by network node 115. The decimation factor indicates a predefined number of slots, wherein one out of the predefined number of slots is for transmitting a TPC command to wireless device 110.

In certain embodiments, the configurable repetition/decimation factor may be a consideration. In order to exemplify the operation of both candidate algorithms, the parameter N has been used to determine the number of consecutive slots to be processed by the algorithms. Although the values of 1, 3, and 5 slots have been utilized in the examples described herein, the repetition/decimation factor may be any suitable number. In some cases, the repetition/decimation factor may be a single hard-coded value (as in the legacy Algorithm 2). In some cases, it may be a configurable value signaled from radio network controller 120 to network node 115 and wireless device 110. Thus, in certain embodiments, the number of TPC commands to be processed by the Rel-13 candidate algorithms may be a single hard coded value as in the existing legacy Algorithm 2. In other embodiments, the number of TPC commands to be processed may be a configurable value signaled from radio network controller 120 to the network node 115 and wireless device 110.

Upon determining the decimation factor for the TPC algorithm, radio network controller 120 modifies one or more parameters related to transmit power control to optimize transmit power control using the TPC algorithm having the determined decimation factor, and configures network node 115 to control the transmit power of wireless device 110 according to the TPC algorithm and the one or more modified parameters.

In certain embodiments, wireless device 110 receives, from network node 115, the TPC command for controlling the transmit power of wireless device 110. The TPC command may be received according to the TPC algorithm. The TPC algorithm may comprise a power control algorithm in which TPC commands for controlling the transmit power of wireless device 110 are discontinuously transmitted to wireless device 110 by network node 115 such that wireless device 110 receives a TPC command in one out of a predefined number of slots, the predefined number of slots indicated by the decimation factor. The received TPC command may be received in one out of the predefined number of slots indicated by the decimation factor. Wireless device 110 performs one or more operations related to transmit power control to optimize transmit power control using the TPC algorithm. In some cases, wireless device 110 does not process TPC commands in slots other than the slot out of the predefined number of slots for which wireless device 110 is configured to receive a TPC command.

Radio network controller 120 may modify the one or more parameters related to transmit power control to optimize transmit power control using the TPC algorithm having the determined decimation factor in any suitable manner. As a first example, in certain embodiments radio network controller 120 may configure wireless device 110 to toggle TPC commands sent to network node 115 to control the transmit power of network node 115.

As described above, there is a need to clarify the generation of TPC commands used for controlling the transmit power of network node 115. According to existing approaches, wireless device 110 measures the quality (e.g., the signal-to-noise ratio (SNR), Signal to Interference Ratio (SIR), or other suitable measure of quality) of the F-DPCH or DL DPCCH (depending on which channel is configured), and compares it with a target. If the quality is worse (i.e., SIR estimate<SIR target), then a TPC command UP is sent on DPCCH, and vice versa. This process is done every slot. However, when there is insufficient information to form slot-based SIR estimates, either because TPC commands on the F-DPCH are DTXed or symbols are being combined over several slots (depending on the employed Rel-13 algorithm), toggling of the TPC commands is one aspect to consider with respect to the generation of the TPC commands sent on the UL DPCCH.

According to the 3GPP specifications, the TPC commands sent on the UL DPCCH are transmitted on a slot basis. In certain embodiments, when in the new Rel-13 candidate algorithms the TPC commands sent on the F-DPCH are DTXed or symbols are being combined, wireless device 110 may consider to keep the same network node 115 transmit power by "toggling" the TPC commands during N−1 slots, until wireless device 110 is able to make a new SIR estimate and decide to send TPC UP or TPC DOWN. That is to say, during an N-slot based TPC cycle, wireless device 110 will estimate one "slot" SIR (i.e., quality measure), for example in the slot where the TPC command is received in the F-DPCH for the DTX algorithm or on the combined SIR if the combining algorithm is used. In the slot where the estimate is formed, wireless device 110 compares the SIR with the SIR target and issues a corresponding TPC command (UP or DOWN). In the other slots (within the N-slot TPC period), wireless device 110 toggles between UP/DOWN to keep the transmit power as constant as possible.

In certain embodiments, radio network controller 120 may therefore configure wireless device 110 to generate a first TPC command for controlling the transmit power of network node 115 based on one or more measurements in the one out of the predefined number of slots in which wireless device 110 is configured to receive a TPC command. For each remaining slot out of the predefined number of slots in which wireless device 110 is configured to not receive a TPC command, radio network controller 120 configures wireless device 110 to generate additional TPC commands for controlling the transmit power of network node 115 according to one or more predefined rules.

In response, wireless device 110 will toggle TPC commands sent to network node 115 by wireless device 110 to control the transmit power of network node 115. Wireless device 110 generates a first TPC command for controlling the transmit power of network node 115 based on one or more measurements in the one out of the predefined number of slots in which wireless device 110 is configured to receive a TPC command. For each remaining slot out of the predefined number of slots in which wireless device 110 is configured to not receive a TPC command, wireless device 110 generates additional TPC commands for controlling the transmit power of the network node 115 according to one or more predefined rules.

The predefined rules may be any suitable rule or combination of rules for controlling the transmit power of network node 115. As a first example, in certain embodiments if the decimation factor indicating the predefined number of slots comprises a decimation factor of three, wireless device 110 shall generate and communicate to network node 115 in subsequent slots: a second TPC command instructing network node 115 to decrease the transmit power; and a third TPC command instructing network node 115 to increase the transmit power. As another example, if the decimation factor indicating the predefined number of slots comprises a decimation factor of five, wireless device 110 shall generate and communicate to network node 115 in subsequent slots: a second TPC command instructing network node 115 to decrease the transmit power; a third TPC command instructing network node 115 to increase the transmit power; a fourth TPC command instructing network node 115 to decrease the transmit power; and a fifth TPC command instructing network node 115 to increase the transmit power.

Another aspect to consider with respect to controlling the transmit power of network node 115 is SIR Target compensation. In certain embodiments, wireless device 110 may consider to temporarily change (i.e., during N−1 slots) the SIRtarget used to derive the TPC commands to be transmitted in UL DPCCH. For example, if there is no new SIRest available in N−1 slots (DL TPC command DTXed) and the same value has to be kept to derive the TPC command to be sent in UL, then the SIRtarget could be modified during N−1 slots in order to artificially lead to a "toggling" effect of the TPC commands sent in UL.

As a second example, in certain embodiments radio network controller 120 may modify the one or more parameters related to transmit power control to optimize transmit power control by configuring network node 115 to transmit, during radio link initialization, TPC commands according to a predefined pattern in consecutive slots in which TPC symbols are known by wireless device 110 to be present.

As a third example, radio network controller 120 may modify the one or more parameters related to transmit power control to optimize transmit power control by configuring a TPC step size parameter such that the TPC step size parameter can have a value of either 1 dB or 2 dB. TPC step size compensation is another aspect to consider with respect to controlling the transmit power of network node 115. The step size $\Delta$TPC is a layer 1 parameter which is derived from the UE-specific higher-layer parameter "TPC-StepSize" which is under the control of the UTRAN. If "TPC-StepSize" has the value "dB1", then the layer 1 parameter $\Delta$TPC shall take the value 1 dB and if "TPC-StepSize" has the value "dB2", then $\Delta$TPC shall take the value 2 dB. The parameter "TPC-StepSize" only applies to Algorithm 1 as stated in 3GPP TS 25.212, version 12.1.0 "Multiplexing and channel coding (FDD)," Release 12, 3GPP. For Algorithm 2, $\Delta$TPC shall always take the value 1 dB.

Thus, the parameter "TPC-StepSize" may be applicable for Rel-13 candidate algorithms for processing TPC commands. In certain embodiments, the step size may be fixed to 1 dB or another appropriate step size. In certain embodiments, network node 115 may consider whether to increase/decrease it's transmit power by applying a scaled legacy TPC step size during N slots. For example, when a 5-slot TPC cycle with TPC step size equal to 1 dB is employed, and the TPC algorithm in wireless device 110 would send UP commands on UL DPCCH based on the latest SIR estimate, then the increment in power would be 0.2 dB per slot for the total power adjustment after the N-slot TPC cycle to be 1 dB. Wireless device 110 uses a TPC step size parameter such that the TPC step size parameter can have a value of either 1 dB or 2 dB.

As a fourth example, radio network controller 120 may modify the one or more parameters related to transmit power control to optimize transmit power control by configuring wireless device 110 to receive a TPC command in one out of the predefined number of slots indicated by the decimation factor. In certain embodiments, radio network controller 120 may configure wireless device 110 to not process TPC commands in slots other than the one out of the predefined number of slots for which wireless device 110 is configured to receive a TPC command.

As a fifth example, in certain embodiments, downlink synchronization may be a consideration. 3GPP TS 25.214, V12.2.0 (2015-03), section 4.3.1.2 states that "the UE shall every radio frame check synchronization status of either the DPCH or the F-DPCH depending on which is configured." Therefore when the "DTX of TPC commands" algorithm is utilized, the behavior needs to be clarified. One possibility is to determine in/out-of-sync in the manner as it is determined when UL_DTX_Active is TRUE. Another possibility is that, when the "Repetition of TPC commands" algorithm is utilized, the energy put on the F-DPCH would have to be lowered by the same amount of repetitions to be performed, which may make more difficult to determine the sync status. Thus, there is also a need to verify the in/out-of-sync behavior when the Rel-13 algorithms are utilized. Accordingly, in certain embodiments, radio network controller 120 may modify the one or more parameters related to transmit power control to optimize transmit power control by configuring one or more wireless devices 110 to check a synchronization status of one or more channels based on the determined decimation factor. Wireless device 110 may check a synchronization status of one or more channels based on the decimation factor.

Another consideration with respect to controlling the transmit power of network node 115 is the transmit power of network node 115 being adjusted on a slot cycle basis. In certain embodiments, network node 115 may consider reacting only to one received TPC command per TPC slot cycle, keeping the same transmission power (i.e., ignoring N−1 TPC commands) until wireless device 110 is able to make a new SIR estimate and decides to send TPC UP or TPC DOWN.

Another example consideration with respect to controlling the transmit power of network node 115 is that, in certain embodiments, wireless device 110 sends only one TPC command per N-slot TPC cycle using a DPCCH slot format containing TPC bits. In the other N−1 slots, wireless device 110 does not send any TPC commands and uses a DPCCH slot format that does not contain any TPC bit. Instead a slot format containing, for example, more pilots could be used. A slot format where the TPC bits are reserved for future use can also be envisioned.

In certain embodiments, radio network controller 120 may determine that wireless device 110 is configured for compressed mode such that a transmission gap interrupts a radio frame communicated to wireless device 110, and apply a different TPC algorithm for power controlling wireless device 110 configured for compressed mode. Wireless device 110, configured for compressed mode such that a transmission gap interrupts a radio frame communicated to wireless device 110, receives subsequent TPC commands according to the different TPC algorithm for power controlling wireless device 110 when configured for compressed mode.

In certain embodiments, wireless device 110 may be a first wireless device of a subset of a plurality of wireless device, such as wireless device 110A. In such a case, radio network controller 120 may configure each wireless device 110 of the subset of wireless devices with one of a number of possible different non-overlapping TPC transmission patterns. Radio network controller 120 may configure network node 115 to transmit a TPC command to first wireless device 110A according to the configured TPC transmission pattern for first wireless device 110A, and configure network node 115 to transmit a TPC command to a second wireless device of the subset of wireless devices, such as wireless device 110B, according to the configured TPC transmission pattern for second wireless device 110B, wherein first wireless device 110A and second wireless device 110B share the same TPC symbol position and channelization code conveyed within the same Fractional-Dedicated Physical Channel (F-DPCH). In some cases, the TPC transmission pattern may comprise a different F-DPCH frame timing offset and a slot format. In some cases, the subset of the one or more wireless devices are power controlled using a TPC algorithm having the same decimation factor.

In such an embodiment, wireless device 110A determines a first TPC transmission pattern associated with first wireless device 110A. The first TPC transmission pattern may comprise one of a number of possible different non-overlapping TPC transmission patterns that is different from a second TPC transmission pattern associated with second wireless device 110B included in the subset of the plurality of wireless devices. Wireless device 110A receives, from network node 115, a TPC command according to the first TPC transmission pattern associated with first wireless device 110A. First wireless device 110A and second wireless device 110B share the same TPC symbol position and channelization code conveyed within the same Fractional-Dedicated Physical Channel (F-DPCH). The first and second TPC transmission patterns may comprise a different F-DPCH frame timing offset and a slot format. First wireless device 110A and second wireless device 110B may be power controlled using a TPC algorithm have the same decimation factor.

In certain embodiments, downlink RL initialization may be a consideration. During the Radio Link (RL) initialisation, the TPC commands shall follow a pattern that consists of n instances (n≠0 and the value is obtained from the parameter "DL TPC pattern 01 count", which is passed by higher layers) of the pair of TPC commands ("0","1"), followed by one instance of TPC command "1", where ("0","1") indicates the TPC commands to be transmitted in 2 consecutive slots. Evidently, when in either of the Rel-13 candidate algorithms the slot cycle is larger than 1, the rule of transmitting in 2 consecutive slots may no longer be fulfilled, and the behavior in that case may need clarification. In certain embodiments, one potential way of clarifying the behavior of algorithms that slow down the transmission of TPC commands may consist of saying that in that case (i.e., when the Algorithm 3 is in use), ("0","1") indicates the TPC commands to be transmitted in 2 consecutive slot-cycles rather than in 2 consecutive slots. In certain embodiments, wireless device 110, in performing one or more operations related to transmit power control to optimize transmit power control using the TPC algorithm, may receive, during radio link initialization, TPC commands according to a predefined pattern in consecutive slots in which TPC symbols are known by the wireless device 110 to be present.

Although a number of features of the various embodiments have been described above in connection with FIG. 5, the present disclosure contemplates that the various embodiments are not limited to any one example embodiment. Rather, the present disclosure contemplates that the various features of the various embodiments described herein may be combined in any suitable manner to optimize reduced TPC frequency operation.

In certain embodiments, the soft handover case may be a consideration. When wireless device 110 is in soft handover, multiple TPC commands may be received in each slot from different cells in the active set. Both legacy Algorithms 1 and 2 share a common first phase of combination when wireless device 110 is in soft handover, to later on apply their own specific TPC command processing algorithms independently. The set of statements corresponding to the first phase of combination are shown in Table 2 below:

TABLE 2

| Algorithm 1 for processing TPC commands | Algorithm 2 for processing TPC commands |
| --- | --- |

When a UE is in soft handover, multiple TPC commands may be received in each slot from different cells in the active set.
Let's define M as the maximum number of radio links in the same radio link set:

TABLE 2-continued

| Algorithm 1 for processing TPC commands | Algorithm 2 for processing TPC commands |
|---|---|
| | $TPC_i = \overset{M}{\underset{r=1}{Combine}}(\text{received TPC command}\_r)$ |
| | Once the TPC commands from radio links of the same radio link set in the same TPC command combining period have been combined into one TPC command, they are processed and further combined with any other TPC commands. |

Once the TPC commands from radio links of the same radio link set in the same TPC command combining period have been combined into one TPC command, they are processed and further combined with any other TPC commands. So, per every slot, wireless device 110 deals with N TPC commands from radio links of different radio link sets (i.e., TPCi, where i=1, 2, . . . , N), where in some cases TPCi may have been the result of a first phase of combination.

The Algorithm 1 is directly applicable over a single slot (or formally speaking TPC command combining period). From the entries $TPC_1$ to $TPC_N$, the value of the TPC_CMD (either 1 or −1) is derived. On the other hand, in the Algorithm 2 wireless device 110 shall process received TPC commands on a 5-slot cycle (i.e., a hard coded value) basis. Then, from a set of N×5 entries, the algorithm derives a set of N temporal values across the 5 slots which go from TPC_temp1 to TPC tempN. Later on, from the entries TPC_temp1 to TPC tempN, the value of the TPC_CMD (either 1, −1 or 0) for the Algorithm 2 is derived.

With respect to the Rel-13 candidate proposals, both require wireless device 110 to process received TPC commands on a configurable slot cycle (i.e., X-slot cycle, where for example X=1, 3, or 5). In order to follow the legacy procedures, both proposals "Repetition of TPC commands" (described above with respect to FIG. 5) and "DTX of TPC Commands" (described above with respect to FIG. 6) could follow the same procedure used by the Algorithm 2 up to obtaining a set of N×X entries, to finally derive in the next step the value of TPC_CMD according to each algorithm.

In certain embodiments, the coverage aspects of the Rel-13 candidate algorithms for processing TPC commands may be a consideration. In the algorithm described as "Repetition of TPC commands", the same TPC command is transmitted consecutively N times. Under the assumption that the maximum power set for the radio link carrying the F-DPCH is maintained unchanged during the entire slot-cycle processed by the algorithm, then repeating the TPC commands would bring the benefit of having a better F-DPCH coverage compared to what can be achieved by the algorithm described as "DTX of TPC commands" in the way it is described in the TR on downlink enhancements for UMTS.

Nonetheless, in order to establish a fair comparison among the candidate proposals in terms of the amount of resources (i.e., allocated energy) invested per TPC command, the algorithm described as "DTX of TPC commands" could consider for the single TPC command to be transmitted, re-allocating on it the power not used in the slots where the TPC commands are DTXed.

Figure 8:
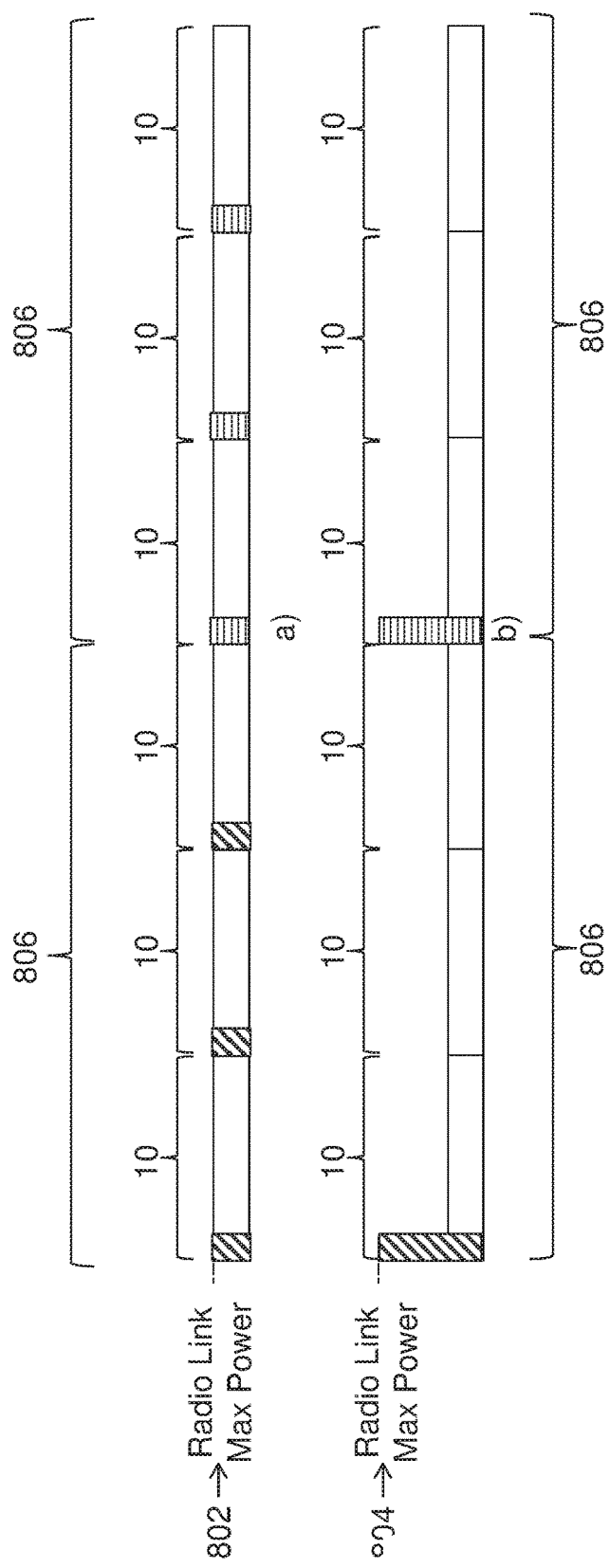
FIG. 8 illustrates an example comparison in terms of energy allocation for the alternative TPC transmission schemes, in accordance with certain embodiments.

FIG. 8 illustrates an example comparison in terms of energy allocation for the alternative TPC transmission schemes, in accordance with certain embodiments. More particularly, FIG. 8 illustrates a first energy allocation 802 for the algorithm described as "Repetition of TPC Commands" and a second energy allocation 804 for the algorithm described as "DTX of TPC Commands." In the comparison in terms of energy allocation for the Rel-13 algorithms used for processing TPC commands depicted in FIG. 8, in order to establish a fair comparison among the Rel-13 candidate algorithms the amount of energy used per slot-cycle 806 would have to be the same. So, for the algorithm described as "DTX of TPC commands," the maximum power of the radio link used for transmitting the TPC commands would have to be set/adjusted as a function of the number slots 10 that compose a slot-cycle 806. Accordingly, in certain embodiments, the maximum power of the radio link used for transmitting the TPC commands may be set or adjusted as a function of the number slots that compose a slot-cycle.

In certain embodiments, capacity aspects of DTX of TPC commands may be a consideration. In the algorithm described as "DTX of TPC commands," only one TPC command is transmitted within a set of N consecutive slots. Reducing the updating frequency of the TPC commands by applying DTX in all but one of the TPC commands within a set of N slots will allow the release of N−1 slots. The released N−1 slots can be used to allocate TPC command transmissions for more users compared to what is possible to allocate with the algorithm described as "Repetition of TPC commands." Therefore the algorithm "DTX of TPC commands" indirectly increases the system's capacity.

As described above, through clever selection of the F-DPCH frame timing and slot format, a radio network controller, such as radio network controller 120 described above in connection with FIG. 7 may enable multiple wireless devices 110 to share the same F-DPCH TPC symbol position and channelization code.

Figure 9:
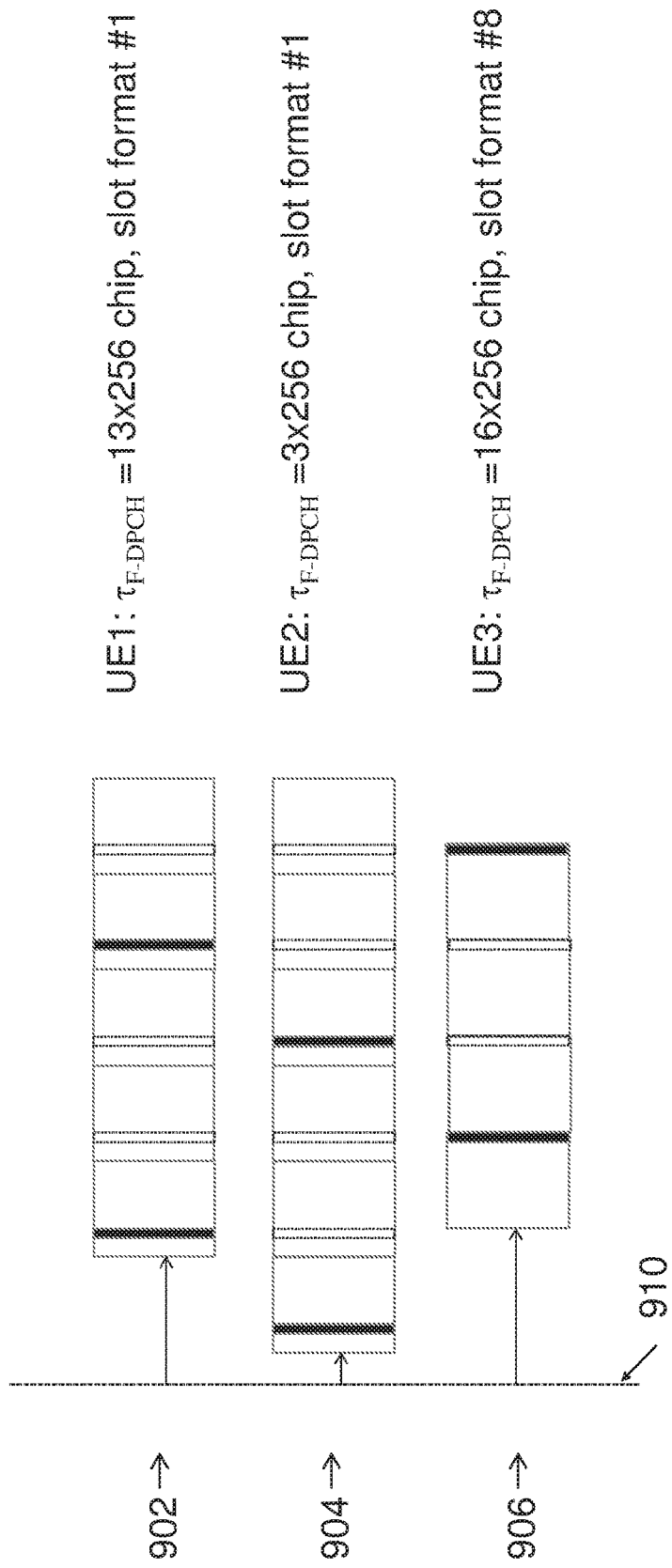
FIG. 9 illustrates another example TPC transmission scheme that varies the F-DPCH frame timing and slot format, in accordance with certain embodiments.

FIG. 9 illustrates another example TPC transmission scheme that varies the F-DPCH frame timing and slot format, in accordance with certain embodiments. More particularly, FIG. 9 illustrates three example scenarios 902, 904, and 906. Each example scenario 902, 904, and 906 has a unique F-DPCH TPC symbol position. To illustrate, assume that the slots in a F-DPCH radio frame are numbered 0, 1, . . . , 14. Further assume that a TPC frequency reduction of factor 3 (N=3) is applied, and that it has been specified that the first of the TPC commands in a group is transmitted in F-DPCH slots 0, 3, 6, 9, and 12. Thus, in this example, a wireless device, such as wireless device 110 described above in connection with FIG. 7 will receive the TPC command in only in slots 0, 3, 6, 9, and 12. As depicted in FIG. 9, by varying the F-DPCH frame timing and slot format in each of scenarios 902, 904, and 906, three wireless devices (i.e., UEs) can share the same F-DPCH TPC symbol position.

In certain embodiments, the radio network controller, such as radio network controller 120 described above with respect to FIG. 7, may dynamically assign suitable combinations of F-DPCH frame timings and slot formats to enable multiplexing of multiple wireless devices on the same F-DPCH TPC symbol position on the same F-DPCH channelization code. The start point 910 (relative to the P-CCPCH frame, measured in chip) of the transmitted TPC symbols for a wireless device 110 using a reduction factor of N may be:

$$TPC\_TX\_offset=(\tau_{F\text{-}DPCH}+2560*k*N+256*N_{OFF1}/2) \mod 38400,$$

for k=0, 1, . . . , 15/N−1
where $\tau_{F\text{-}DPCH}$ is the F-DPCH frame timing offset relative to P-CCPCH, and $N_{OFF1}$ can be found in the F-DPCH slot format table for the used slot format.

Two wireless devices may share the same F-DPCH TPC symbol position if they share the same TPC symbol timing for the first TPC symbol during the P-CCPCH frame. This timing (relative to the P-CCPCH frame, measured in chips) may be expressed as:

$$\text{TPC\_first\_offset} = (\tau_{F\text{-}DPCH} + 256 * N_{OFF1}/2) \text{ modulo } 2560$$

To enable sharing of the same F-DPCH TPC symbol position, the radio network controller will try to configure F-DPCH frame timing offsets and slot formats so that there are no colliding TPC_TX_offset values for all values of k for the concerned wireless devices 110, while TPC_first_offset is the same for the concerned wireless devices.

As there may be multiple combinations of F-DPCH frame timing offsets and slot formats that results in the same F-DPCH TPC symbol positions, such calculations may be made in several different ways. For example, in a particular embodiment, a number of N wireless devices all using a TPC frequency reduction factor of N can share the same F-DPCH TPC symbol position and channelization code.

In another embodiment, it is fully possible to employ different values of N for different wireless devices. However, to enable efficient sharing of the same F-DPCH TPC symbol position and channelization code, wireless devices allocated to this F-DPCH TPC symbol position may all be configured to use the same decimation factor N. Hence, to optimize the capacity, it may be a responsibility of the radio network controller to attempt to allocate wireless devices with the same decimation factor N to the same F-DPCH TPC symbol position. It is however possible to mix wireless devices with different decimation factors N on the same F-DPCH channelization code. It is mixing of different N on the same channelization code and the same F-DPCH TPC symbol position that may be problematic.

There may be cases where a perfect packing of wireless devices into the available F-DPCH TPC symbol positions and channelization codes will not be possible. However, the packing that has been possible will then have contributed with a capacity benefit, possibly reducing the number of channelization codes that need to be allocated to F-DPCH.

As described above, in some cases a wireless device, such as wireless device 110 described above with respect to FIG. 7, may operate in compressed mode. In such a case, the power control operation is stopped during the transmission gap since no TPC commands are sent in the gap. Since in the "DTX of TPC commands" algorithm only one TPC command out of N is transmitted, the interruption of power control might get extended up to N−1 slots on each side of the gap. Exactly how long this additional interruption is depends on the slot cycle and the configuration of the position and length of the transmission gap. This additional power control interruption might lead to a negative impact on the performance of the algorithm, since the power control operation will be stopped for a longer amount of time than the configured TGL. In certain embodiments, however, the "DTX of TPC commands" algorithm may transmit one TPC command just before and/or right after the transmission gap in order to reduce the amount of time in which the UE lacks power control.

Figure 10:
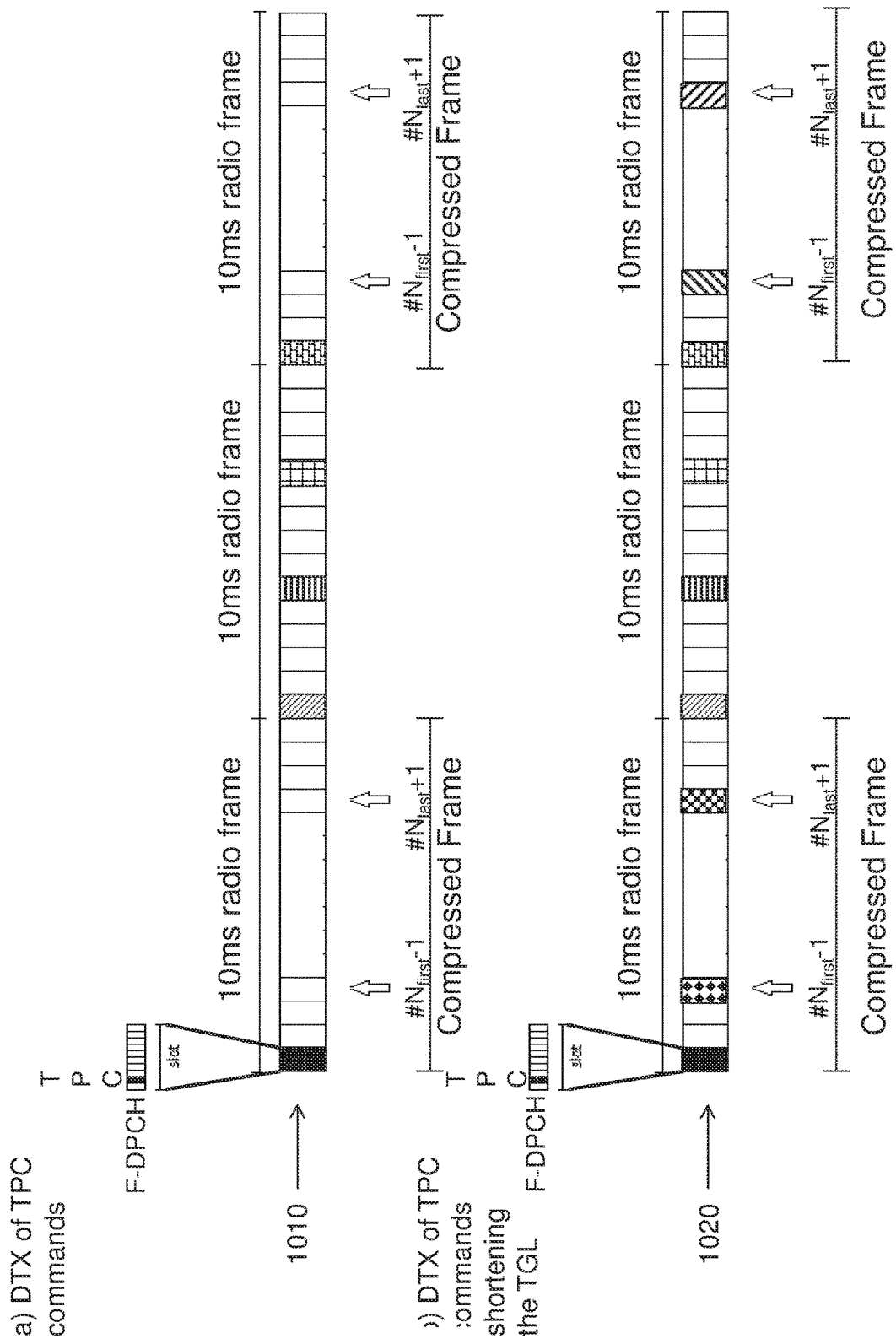
FIG. 10 illustrates an example TPC transmission scheme for a compressed mode of operation, in accordance with certain embodiments.

FIG. 10 illustrates an example TPC transmission scheme for a compressed mode of operation, in accordance with certain embodiments. More particularly, FIG. 10 illustrates a first example 1010 of DTX of TPC commands and a second example 1020 of DTX of TPC commands shortening the TGL. Example 1010 illustrates compressed mode of operation for a five-slot cycle including DTX of TPC commands. Example 1020 illustrates a compressed mode of operation for a five-slot cycle including DTX of TPC commands with shortened TGL. In certain embodiments, the indirect extension of the TGL introduced by the "DTX of TPC commands" algorithm could be addressed by transmitting independently of the configured slot-cycle additional TPC commands on the slots $N_{first-1}$ and $N_{last+1}$ of the compressed frame. So, transmitting up to two additional TPC commands per transmission gap would allow for better wireless device power control in compressed mode, while the benefits brought by the "DTX of TPC commands" algorithm are preserved.

It should be noted, that if $N_{first}=0$ then the additional TPC command will be sent in the last slot in the previous radio frame and if $N_{last}=15$ then the additional TPC command will be sent in the first slot in the next radio frame. If the slots $N_{first-1}$ and $N_{last+1}$ already contain a TPC command in accordance with the configured slot-cycle N, then no additional TPC command is needed in that slot.

If additional TPC commands are inserted outside of the slot-cycle N, this will mean that multiplexing of multiple wireless devices 110 on the same F-DPCH TPC symbol position might no longer be possible. This is due to the fact that the extra TPC commands may fall into positions already occupied by other wireless devices' TPC symbols. To avoid this, wireless devices 110 entering compressed mode may have to be reconfigured to use a different F-DPCH TPC symbol position which is not shared with any other wireless device.

Yet another possibility to reduce the additional lack of power control that may arise when the "DTX of TPC commands" algorithm is used in compressed mode is to perform a fall back to the legacy 1500 Hz power control algorithm for processing TPC commands during the time spent with compressed mode configured. Accordingly, in certain embodiments, the algorithm described as "DTX of TPC commands" may be optimized such that one TPC command is transmitted just before the TGL and one TPC command is transmitted just after the TGL. Doing so may reduce the amount of time in which the wireless device 110 lacks power control in compressed mode.

Figure 11:
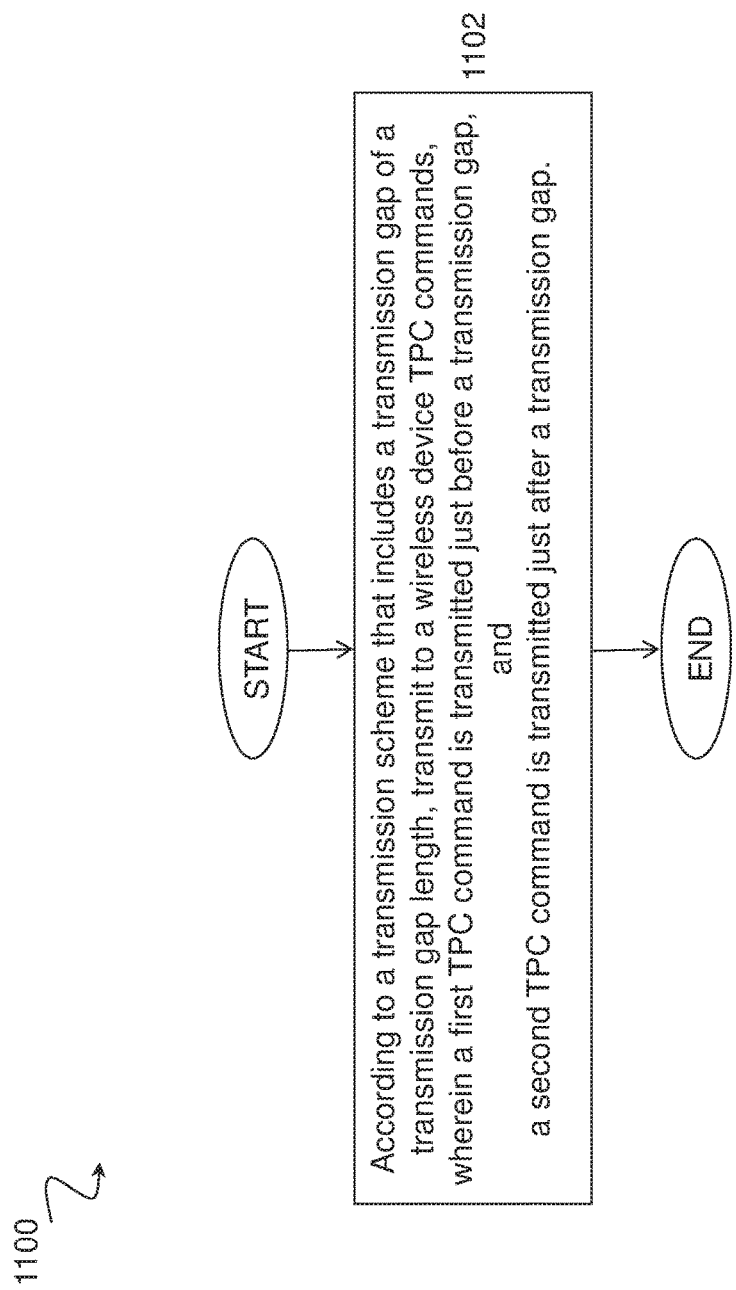
FIG. 11 is a flow diagram of a method providing optimizations for reduced transmit power control frequency operation, in accordance with certain embodiments.

FIG. 11 is a flow diagram of a method 1100 providing optimizations for reduced TPC frequency operation, in accordance with certain embodiments. At step 1102, for example, TPC commands may be transmitted to a wireless device, wherein each TPC command may be separated by a transmission gap of a transmission gap length. A first TPC command is transmitted just before a transmission gap, and a second TPC command is transmitted just after the transmission gap. The wireless device may be in compressed mode. In certain embodiments, the wireless device may not be in soft handover and one TPC command may be received in each slot. In certain embodiments, during the generation of the UL TPC commands derived from the Rel-13 algorithm, a "toggling" of the TPC commands generated may be performed. In certain embodiments, a TPC step size may be adjusted. In certain embodiments, SIR Target adjustments when the TPC commands are DTXed/Symbols being combined may be performed.

Figure 12:
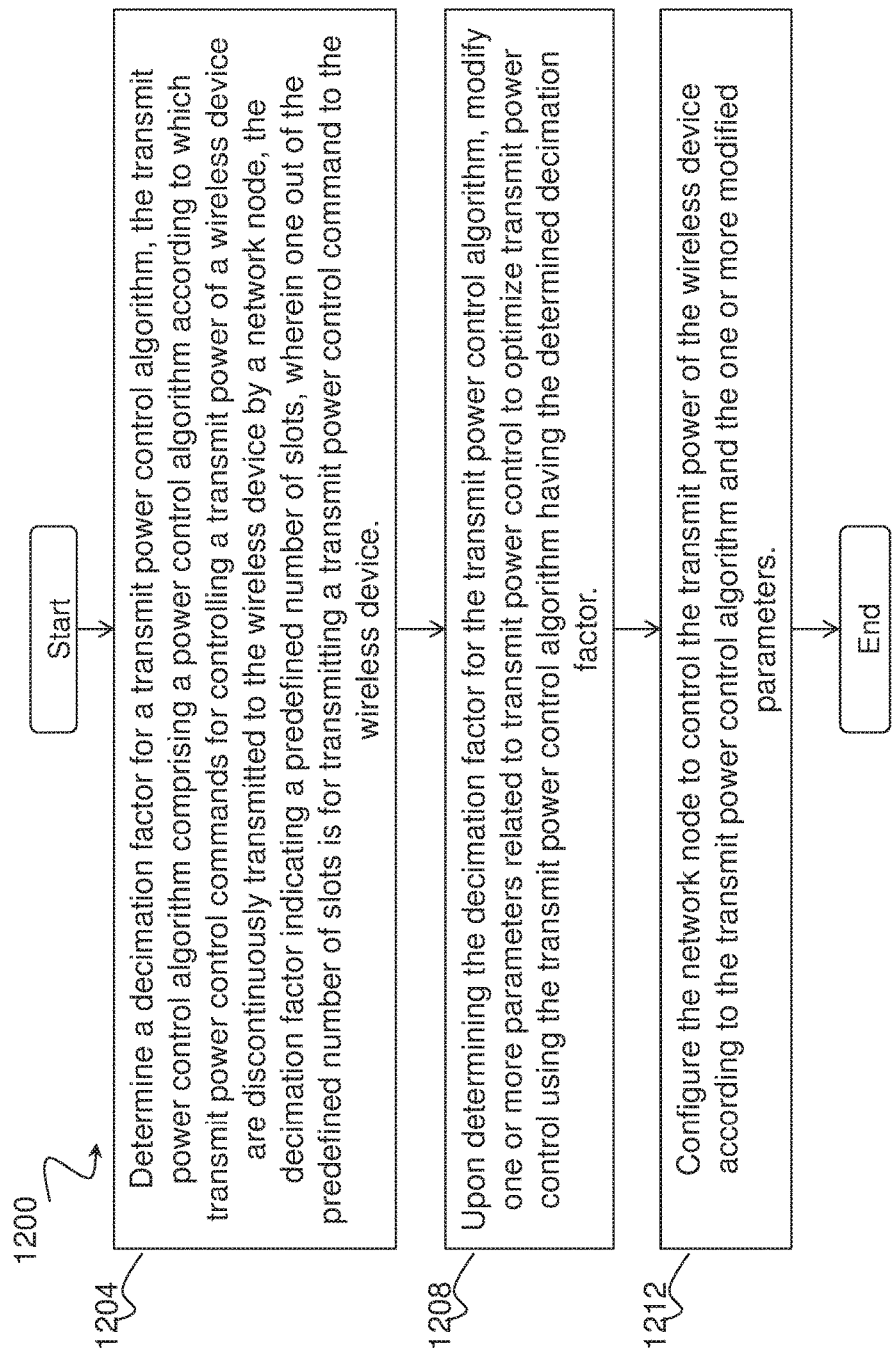
FIG. 12 is a flow diagram of a method in a radio network controller, in accordance with certain embodiments.

FIG. 12 is a flow diagram of a method 1200 in a radio network controller, in accordance with certain embodiments. The method begins at step 1204, where the radio network controller determines a decimation factor for a TPC algorithm, the TPC algorithm comprising a power control algorithm according to which TPC commands for controlling a transmit power of a wireless device are discontinuously transmitted to the wireless device by a network node, the decimation factor indicating a predefined number of slots, wherein one out of the predefined number of slots is for transmitting a TPC command to the wireless device.

At step 1208, the radio network controller, upon determining the decimation factor for the TPC algorithm, modifies one or more parameters related to transmit power control to optimize transmit power control using the TPC algorithm having the determined decimation factor.

In certain embodiments, modifying one or more parameters related to transmit power control to optimize transmit power control using the TPC algorithm having the determined decimation factor may comprise configuring the wireless device to toggle TPC commands sent to the network node to control the transmit power of the network node. Configuring the wireless device to toggle TPC commands sent to the network node to control the transmit power of the network node may comprise configuring the wireless device to: generate a first TPC command for controlling the transmit power of the network node based on one or more measurements in the one out of the predefined number of slots in which the wireless device is configured to receive a TPC command; and for each remaining slot out of the predefined number of slots in which the wireless device is configured to not receive a TPC command, generate additional TPC commands for controlling the transmit power of the network node according to one or more predefined rules. In certain embodiments, the one or more predefined rules may comprise: if the decimation factor indicating the predefined number of slots comprises a decimation factor of three, the wireless device shall generate and communicate to the network node in subsequent slots: a second TPC command instructing the network node to decrease the transmit power; and a third TPC command instructing the network node to increase the transmit power. In certain embodiments, the one or more predefined rules may comprise: if the decimation factor indicating the predefined number of slots comprises a decimation factor of five, the wireless device shall generate and communicate to the network node in subsequent slots: a second TPC command instructing the network node to decrease the transmit power; a third TPC command instructing the network node to increase the transmit power; a fourth TPC command instructing the network node to decrease the transmit power; and a fifth TPC command instructing the network node to increase the transmit power.

In certain embodiments, modifying one or more parameters related to transmit power control to optimize transmit power control using the TPC algorithm having the determined decimation factor may comprise configuring the network node to transmit, during radio link initialization, TPC commands according to a predefined pattern in consecutive slots in which TPC symbols are known by the wireless device to be present.

In certain embodiments, modifying one or more parameters related to transmit power control to optimize transmit power control using the TPC algorithm having the determined decimation factor may comprise configuring a TPC step size parameter such that the TPC step size parameter can have a value of either 1 dB or 2 dB.

In certain embodiments, modifying one or more parameters related to transmit power control to optimize transmit power control using the TPC algorithm having the determined decimation factor may comprise configuring the wireless device to receive a TPC command in one out of the predefined number of slots indicated by the decimation factor. The method may comprise configuring the wireless device to not process TPC commands in slots other than the one out of the predefined number of slots for which the wireless device is configured to receive a TPC command.

In certain embodiments, modifying one or more parameters related to transmit power control to optimize transmit power control using the TPC algorithm having the determined decimation factor may comprise configuring the one or more wireless devices to check a synchronization status of one or more channels based on the determined decimation factor.

At step 1212, the radio network controller configures the network node to control the transmit power of the wireless device according to the TPC algorithm and the one or more modified parameters. In certain embodiments, the method may comprise determining that the wireless device is configured for compressed mode such that a transmission gap interrupts a radio frame communicated to the wireless device, and applying a different TPC algorithm for power controlling the wireless device configured for compressed mode.

In certain embodiments, the wireless device may be a first wireless device of a subset of a plurality of wireless device, and the method may comprise: configuring each wireless device of the subset of wireless devices with one of a number of possible different non-overlapping TPC transmission patterns; configuring the network node to transmit a TPC command to the first wireless device according to the configured TPC transmission pattern for the first wireless device; and configuring the network node to transmit a TPC command to a second wireless device of the subset of wireless devices according to the configured TPC transmission pattern for the second wireless device, wherein the first wireless device and the second wireless device share the same TPC symbol position and channelization code conveyed within the same Fractional-Dedicated Physical Channel (F-DPCH). In some cases, the TPC transmission pattern may comprise a different F-DPCH frame timing offset and a slot format. In some cases, the subset of the one or more wireless devices may be power controlled using a TPC algorithm having the same decimation factor.

Figure 13:
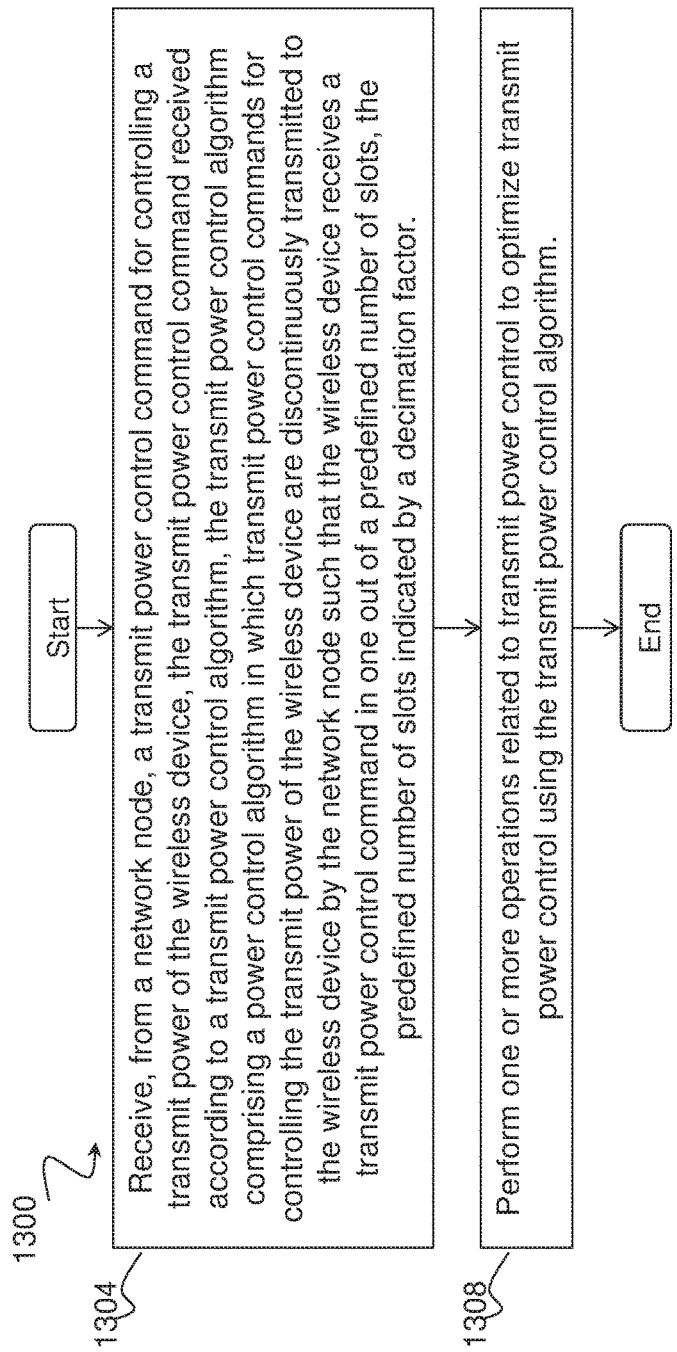
FIG. 13 is a flow diagram of a method in of a method in a wireless device, in accordance with certain embodiments.

FIG. 13 is a flow diagram of a method 1300 in of a method in a wireless device, in accordance with certain embodiments. The method begins at step 1304, where the wireless device receives, from a network node, a TPC command for controlling a transmit power of the wireless device, the TPC command received according to a TPC algorithm, the TPC algorithm comprising a power control algorithm in which TPC commands for controlling the transmit power of the wireless device are discontinuously transmitted to the wireless device by a network node such that the wireless device receives a TPC command in one out of a predefined number of slots, the predefined number of slots indicated by a decimation factor. In some cases, the received TPC command may be received in one out of the predefined number of slots indicated by the decimation factor. In certain embodiments, the method may comprise not processing TPC commands in slots other than the slot out of the predefined number of slots for which the wireless device is configured to receive a TPC command.

At step 1308, the wireless device performs one or more operations related to transmit power control to optimize transmit power control using the TPC algorithm. In certain embodiments, performing one or more operations related to transmit power control to optimize transmit power control using the TPC algorithm may comprise toggling TPC commands sent to the network node by the wireless device to control the transmit power of the network node. Toggling TPC commands sent to the network node by the wireless device to control the transmit power of the network node may comprise: generating a first TPC command for controlling the transmit power of the network node based on one or more measurements in the one out of the predefined number of slots in which the wireless device is configured to receive a TPC command; and for each remaining slot out of the predefined number of slots in which the wireless device is configured to not receive a TPC command, generating additional TPC commands for controlling the transmit power of the network node according to one or more predefined rules. In some cases, generating additional TPC commands for controlling the transmit power of the network node according to one or more predefined rules may comprise: if the decimation factor indicating the predefined number of slots comprises a decimation factor of three, generating and communicating to the network node in subsequent slots: a second TPC command instructing the network node to decrease the transmit power; and a third TPC command instructing the network node to increase the transmit power. In some cases, generating additional TPC commands for controlling the transmit power of the network node according to one or more predefined rules may comprise: if the decimation factor indicating the predefined number of slots comprises a decimation factor of five, generating and communicating to the network node in subsequent slots: a second TPC command instructing the network node to decrease the transmit power; a third TPC command instructing the network node to increase the transmit power; a fourth TPC command instructing the network node to decrease the transmit power; and a fifth TPC command instructing the network node to increase the transmit power.

In certain embodiments, performing one or more operations related to transmit power control to optimize transmit power control using the TPC algorithm may comprise: receiving, during radio link initialization, TPC commands according to a predefined pattern in consecutive slots in which TPC symbols are known by the wireless device to be present.

In certain embodiments, performing one or more operations related to transmit power control to optimize transmit power control using the TPC algorithm may comprise: using a TPC step size parameter such that the TPC step size parameter can have a value of either 1 dB or 2 dB.

In certain embodiments, performing one or more operations related to transmit power control to optimize transmit power control using the TPC algorithm may comprise: checking a synchronization status of one or more channels based on the decimation factor.

In certain embodiments, the wireless device may be configured for compressed mode such that a transmission gap interrupts a radio frame communicated to the wireless device, and the method may comprise receiving subsequent TPC commands according to a different TPC algorithm for power controlling the wireless device configured for compressed mode.

In certain embodiments, the wireless device may be a first wireless device of a subset of a plurality of wireless device, and the method may comprise: determining a first TPC transmission pattern associated with the first wireless device, the first TPC transmission pattern comprising one of a number of possible different non-overlapping TPC transmission patterns that is different from a second TPC transmission pattern associated with a second wireless device included in the subset of the plurality of wireless devices; and receiving, from the network node, a TPC command according to the first TPC transmission pattern associated with the first wireless device, wherein the first wireless device and the second wireless device share the same TPC symbol position and channelization code conveyed within the same Fractional-Dedicated Physical Channel (F-DPCH). In some cases, the first and second TPC transmission patterns may comprise a different F-DPCH frame timing offset and a slot format. In some cases, the first wireless device and the second wireless device may be power controlled using a TPC algorithm have the same decimation factor.

Figure 14:
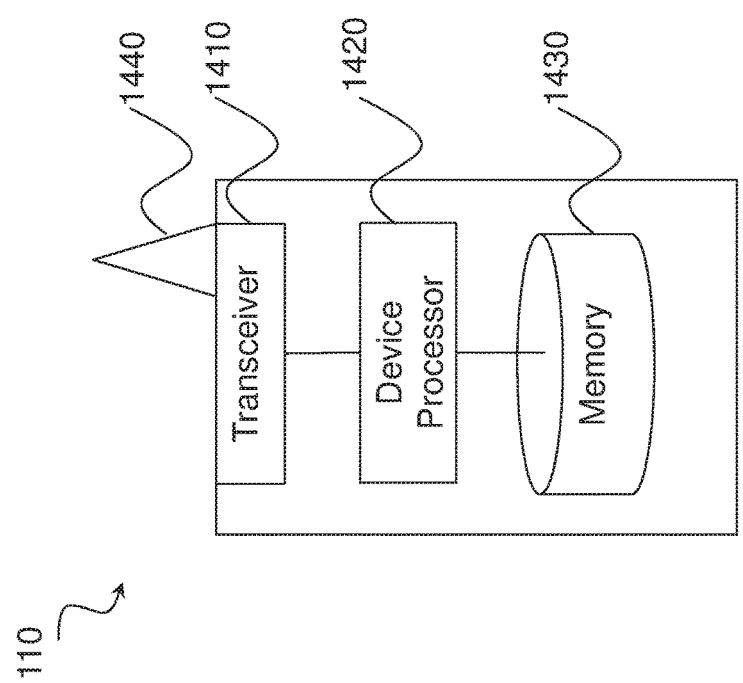
FIG. 14 is a block schematic of an exemplary wireless device, in accordance with certain embodiments.

FIG. 14 is a block schematic of an exemplary wireless device, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 1410, processor 1420, and memory 1430. In some embodiments, transceiver 1410 facilitates transmitting wireless signals to and receiving wireless signals from network node 115 (e.g., via antenna 1440), processor 1420 executes instructions to provide some or all of the functionality described above as being provided by wireless device 110, and memory 1430 stores the instructions executed by processor 1420.

Processor 1420 may include any suitable combination of hardware and software implemented in one or more modules to execute instructions and manipulate data to perform some or all of the described functions of wireless device 110, such as the functions of wireless device 110 described above in relation to FIGS. 1-13. In some embodiments, processor 1420 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 1430 is generally operable to store instructions, such as a computer program, software, an application including one or more of logic, rules, algorithms, code, tables, etc. and/or other instructions capable of being executed by a processor. Examples of memory 1430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 1020.

Other embodiments of wireless device 110 may include additional components beyond those shown in FIG. 14 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 1420. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 15:
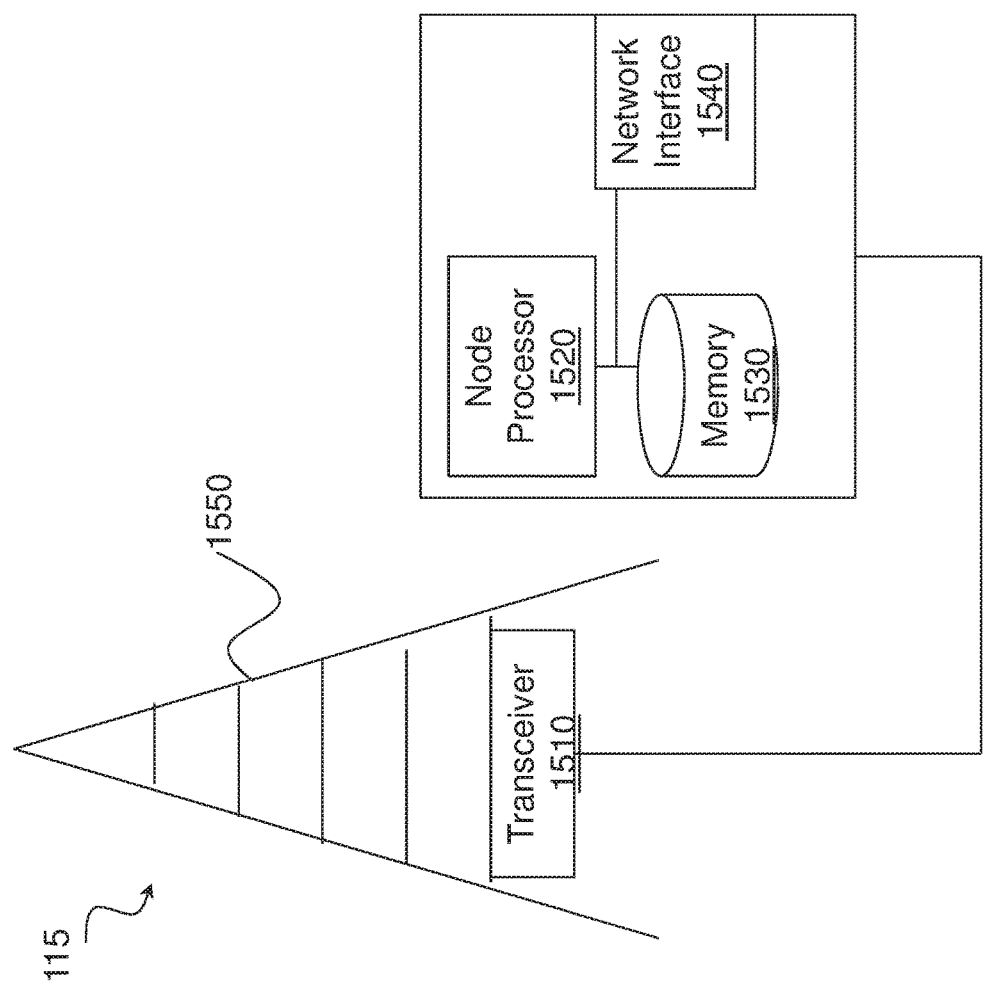
FIG. 15 is a block schematic of an exemplary network node, in accordance with certain embodiments.

FIG. 15 is a block schematic of an exemplary network node, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1510, processor 1520, memory 1530, and network interface 1540. In some embodiments, transceiver 1510 facilitates transmitting wireless signals to and receiving wireless signals from wireless device 110 (e.g., via antenna 1550), processor 1520 executes instructions to provide some or all of the functionality described above as being provided by a network node 115, memory 1530 stores the instructions executed by processor 1520, and network interface 1540 communicates signals to backend network components, such as a gateway, switch, router, Internet, Public Switched Telephone Network (PSTN), core network nodes or radio network controllers 130, etc.

Processor 1520 may include any suitable combination of hardware and software implemented in one or more modules to execute instructions and manipulate data to perform some or all of the described functions of network node 115, such as those described above in relation to FIGS. 1-13 above. In some embodiments, processor 1520 may include, for example, one or more computers, one or more central processing units (CPUs), one or more microprocessors, one or more applications, and/or other logic.

Memory 1530 is generally operable to store instructions, such as a computer program, software, an application including one or more of logic, rules, algorithms, code, tables, etc. and/or other instructions capable of being executed by a processor. Examples of memory 1530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1540 is communicatively coupled to processor 1520 and may refer to any suitable device operable to receive input for network node 115, send output from network node 115, perform suitable processing of the input or output or both, communicate to other devices, or any combination of the preceding. Network interface 1540 may include appropriate hardware (e.g., port, modem, network interface card, etc.) and software, including protocol conversion and data processing capabilities, to communicate through a network.

Other embodiments of network node 115 may include additional components beyond those shown in FIG. 15 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 16:
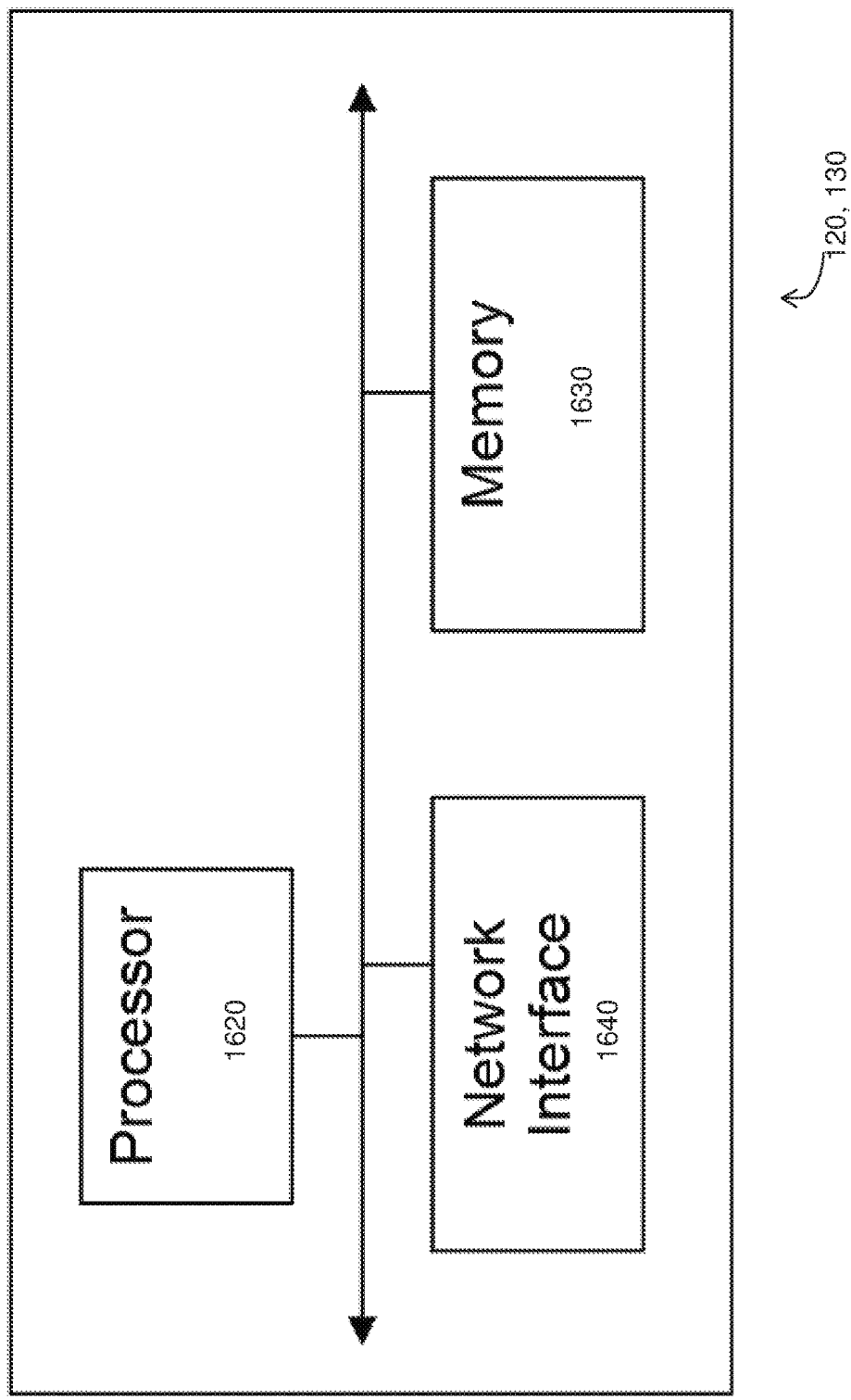
FIG. 16 is a block schematic of an exemplary radio network controller or core network node, in accordance with certain embodiments.

FIG. 16 is a block schematic of an exemplary radio network controller 120 or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller 120 or core network node 130 includes processor 1620, memory 1630, and network interface 1640. In some embodiments, processor 1620 executes instructions to provide some or all of the functionality described above as being provided by the network node, memory 1630 stores the instructions executed by processor 1620, and network interface 1640 communicates signals to any suitable node, such as a gateway, switch, router, Internet, Public Switched Telephone Network (PSTN), network nodes 115, radio network controllers 120 or core network nodes 130, etc.

Processor 1620 may include any suitable combination of hardware and software implemented in one or more modules to execute instructions and manipulate data to perform some or all of the described functions of the radio network controller 120 or core network node 130. In some embodiments, processor 1620 may include, for example, one or more computers, one or more central processing units (CPUs), one or more microprocessors, one or more applications, and/or other logic.

Memory 1630 is generally operable to store instructions, such as a computer program, software, an application including one or more of logic, rules, algorithms, code, tables, etc. and/or other instructions capable of being executed by a processor. Examples of memory 1630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1640 is communicatively coupled to processor 1620 and may refer to any suitable device operable to receive input for the network node, send output from the network node, perform suitable processing of the input or output or both, communicate to other devices, or any combination of the preceding. Network interface 1640 may include appropriate hardware (e.g., port, modem, network interface card, etc.) and software, including protocol conversion and data processing capabilities, to communicate through a network.

Other embodiments of the network node may include additional components beyond those shown in FIG. 16 that may be responsible for providing certain aspects of the network node's functionality, including any of the functionality described above and/or any additional functionality (including any functionality necessary to support the solution described above).

Figure 17:
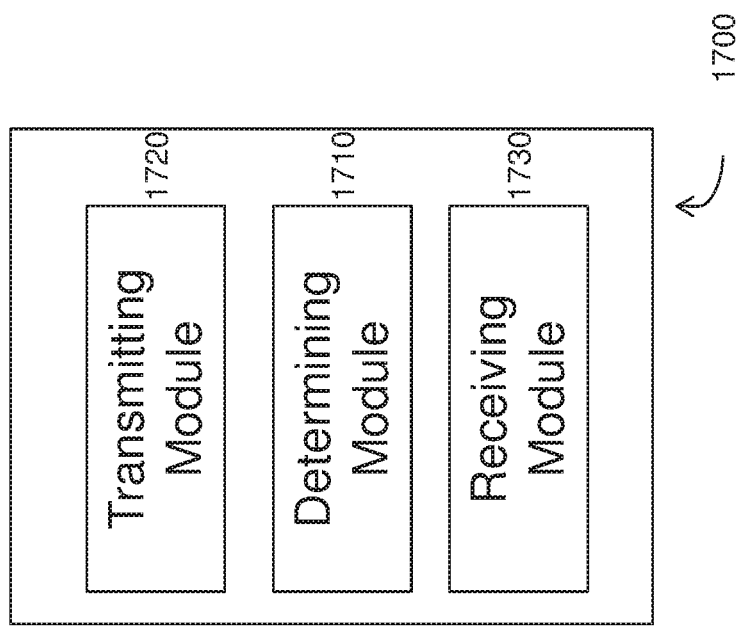
FIG. 17 illustrates an example computer networking virtual apparatus, according to certain embodiments.

FIG. 17 illustrates an example computer networking virtual apparatus, in accordance with certain embodiments. In certain embodiments, radio network controller 120 may operate as a computer networking virtual apparatus. FIG. 17 is a block diagram illustrating a computer networking virtual apparatus 1700. Virtual apparatus 1700 may include one or more modules. For example, virtual apparatus 1700 includes at least one transmitting module 1720, at least one determining module 1710, and a receiving module 1730, and any other suitable modules. Virtual apparatus 1700 may perform the optimizations for reduced TPC frequency operation described above with respect to FIGS. 1-13.

Determining module 1710 may perform the processing functions of radio network controller 120. For example, determining module 1710 may determine a decimation factor for a transmit power control algorithm, the transmit power control algorithm comprising a power control algorithm according to which transmit power control commands for controlling a transmit power of a wireless device are discontinuously transmitted to the wireless device by a network node, the decimation factor indicating a predefined number of slots, wherein one out of the predefined number of slots is for transmitting a transmit power control command to the wireless device. As another example, determining module 1710 may, upon determining the decimation factor for the transmit power control algorithm, modify one or more parameters related to transmit power control to optimize transmit power control using the transmit power control algorithm having the determined decimation factor. As another example, determining module 1710 may configure the network node to control the transmit power of the wireless device according to the transmit power control algorithm and the one or more modified parameters. Determining module 1710 may include or be included in one or more processors, such as processor 1620 described above with respect to FIG. 16. Determining module 1710 may include analog and/or digital circuitry configured to perform any of the functions of determining module 1710. The functions of determining module 1710 described above may, in certain embodiments, be performed in one or more distinct modules.

Transmitting module 1720 may perform the transmission functions of radio network controller 120. Transmitting module 1720 may transmit messages to one or more of network nodes 115 and wireless devices 110 of network 100. Transmitting module 1720 may include a transmitter and/or a transceiver, and/or a network interface, such as network interface 1640 described above with respect to FIG. 16. Transmitting module 1720 may include circuitry configured to wirelessly transmit messages and/or signals. In particular embodiments, communication module 1720 may receive messages and/or signals for transmission from determining module 1710. In certain embodiments, the functions of communication module 1720 described above may be performed in one or more distinct modules.

Receiving module 1730 may perform the receiving functions of radio network controller 120. Receiving module 1730 may include a transmitter and/or a transceiver, and/or a network interface, such as network interface 1640 described above with respect to FIG. 16. Receiving module 1730 may include circuitry configured to wirelessly receive messages and/or signals. In particular embodiments, receiving module 1730 may communicate received messages and/or signals to determining module 1710.

FIG. 18 is a block schematic of an exemplary wireless device, in accordance with certain embodiments. Wireless device 110 may include one or more modules. For example, wireless device 110 may include a determining module 1810, a communication module 1320, a receiving module 1830, an input module 1840, a display module 1850, and any other suitable modules. Wireless device 110 may perform the optimizations for reduced TPC frequency operation described above with respect to FIGS. 1-13.

Determining module 1810 may perform the processing functions of wireless device 110. For example, determining module 1810 may perform one or more operations related to transmit power control to optimize transmit power control using the transmit power control algorithm. As another example, determining module 1810 may toggle transmit power control commands sent to the network node by the wireless device to control the transmit power of the network node. As another example, determining module 1810 may determine a first transmit power control transmission pattern associated with the first wireless device, the first transmit power control transmission pattern comprising one of a number of possible different non-overlapping transmit power control transmission patterns that is different from a second transmit power control transmission pattern associated with a second wireless device included in the subset of the plurality of wireless devices. Determining module 1810 may include or be included in one or more processors, such as processor 1420 described above in relation to FIG. 14. Determining module 1810 may include analog and/or digital circuitry configured to perform any of the functions of determining module 1810 and/or processor 1420 described above. The functions of determining module 1810 described above may, in certain embodiments, be performed in one or more distinct modules.

Communication module 1820 may perform the transmission functions of wireless device 110. Communication module 1820 may transmit messages to one or more of network nodes 115 of network 100. Communication module 1820 may include a transmitter and/or a transceiver, such as transceiver 1410 described above in relation to FIG. 14. Communication module 1820 may include circuitry configured to wirelessly transmit messages and/or signals. In particular embodiments, communication module 1820 may receive messages and/or signals for transmission from determining module 1810. In certain embodiments, the functions of communication module 1820 described above may be performed in one or more distinct modules.

Receiving module 1830 may perform the receiving functions of wireless device 110. As one example, receiving module 1830 may receive, from a network node, a transmit power control command for controlling a transmit power of the wireless device, the transmit power control command received according to a transmit power control algorithm, the transmit power control algorithm comprising a power control algorithm in which transmit power control commands for controlling the transmit power of the wireless device are discontinuously transmitted to the wireless device by the network node such that the wireless device receives a transmit power control command in one out of a predefined number of slots, the predefined number of slots indicated by a decimation factor. As another example, receiving module 1830 may receive, during radio link initialization, transmit power control commands according to a predefined pattern in consecutive slots in which transmit power control symbols are known by the wireless device (110) to be present. Receiving module 1830 may include a receiver and/or a transceiver, such as transceiver 1410 described above in relation to FIG. 14. Receiving module 1830 may include circuitry configured to wirelessly receive messages and/or signals. In particular embodiments, receiving module 1830 may communicate received messages and/or signals to determining module 1810.

Input module 1840 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1810.

Display module 1850 may present signals on a display of wireless device 110. Display module 1850 may include the display and/or any appropriate circuitry and hardware configured to present signals on the display. Display module 1850 may receive signals to present on the display from determining module 1810.

Determining module 1810, communication module 1820, receiving module 1830, input module 1840, and display module 1850 may include any suitable configuration of hardware and/or software. Wireless device 110 may include additional modules beyond those shown in FIG. 18 that may be responsible for providing any suitable functionality, including any of the functionality described above and/or any additional functionality (including any functionality necessary to support the various solutions described herein).

FIG. 19 is a block schematic of an exemplary network node 115, in accordance with certain embodiments. Network node 115 may include one or more modules. For example, network node 115 may include determining module 1910, communication module 1920, receiving module 1930, and any other suitable modules. In some embodiments, one or more of determining module 1910, communication module 1920, receiving module 1930, or any other suitable module may be implemented using one or more processors, such as processor 1520 described above in relation to FIG. 15. In certain embodiments, the functions of two or more of the various modules may be combined into a single module. Network node 115 may perform the optimizations for reduced TPC frequency operation described above with respect to FIGS. 1-13.

Determining module 1910 may perform the processing functions of network node 115. For example, in certain embodiments the functions of a radio network controller, such as radio network controller 120 described above, may be performed by network node 115. In such a case, determining module 1910 may, for example, determine a decimation factor for a transmit power control algorithm, the transmit power control algorithm comprising a power control algorithm according to which transmit power control commands for controlling a transmit power of a wireless device are discontinuously transmitted to the wireless device by a network node, the decimation factor indicating a predefined number of slots, wherein one out of the predefined number of slots is for transmitting a transmit power control command to the wireless device. As another example, determining module 1910 may, upon determining the decimation factor for the transmit power control algorithm, modify one or more parameters related to transmit power control to optimize transmit power control using the transmit power control algorithm having the determined decimation factor. As yet another example, determining module 1910 may configure the network node to control the transmit power of the wireless device according to the transmit power control algorithm and the one or more modified parameters. Determining module 1910 may include or be included in one or more processors, such as processor 1520 described above in relation to FIG. 15. Determining module 1910 may include analog and/or digital circuitry configured to perform any of the functions of determining module 1910 and/or processor 1520 described above. The functions of determining module 1910 may, in certain embodiments, be performed in one or more distinct modules. For example, in certain embodiments some of the functionality of determining module 1910 may be performed by an allocation module.

Communication module 1920 may perform the transmission functions of network node 115. Communication module 1920 may transmit messages to one or more of wireless devices 110. Communication module 1920 may include a transmitter and/or a transceiver, such as transceiver 1510 described above in relation to FIG. 15. Communication module 1920 may include circuitry configured to wirelessly transmit messages and/or signals. In particular embodiments, communication module 1920 may receive messages and/or signals for transmission from determining module 1910 or any other module.

Receiving module 1930 may perform the receiving functions of network node 115. Receiving module 1930 may receive any suitable information from a wireless device. Receiving module 1930 may include a receiver and/or a transceiver, such as transceiver 1510 described above in relation to FIG. 15. Receiving module 1930 may include circuitry configured to wirelessly receive messages and/or signals. In particular embodiments, receiving module 1930 may communicate received messages and/or signals to determining module 1910 or any other suitable module.

Determining module 1910, communication module 1920, and receiving module 1930 may include any suitable configuration of hardware and/or software. Network node 115 may include additional modules beyond those shown in FIG. 19 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

ABBREVIATIONS USED IN THE PRECEDING DESCRIPTION INCLUDE

AP Access Point
BS Base Station
BSC Base Station Controller
BTS Base Transceiver Station
CDM Code Division Multiplexing
CPE Customer Premises Equipment
CSI Channel State Information
D2D Device-to-device
DAS Distributed Antenna System
DL Downlink
DPCH Dedicated Physical Channel
DTX Discontinuous Transmission
eNB evolved Node B
EPDCCH Enhanced Physical Downlink Control Channel
FDD Frequency Division Duplex
F-DPCH Fractional-Dedicated Physical Channel
LAN Local Area Network
LEE Laptop Embedded Equipment
LME Laptop Mounted Equipment
LTE Long Term Evolution
M2M Machine-to-Machine
MAN Metropolitan Area Network
MCE Multi-cell/multicast Coordination Entity
MIMO Multiple Input Multiple Output
MR Measurement Restriction
MSR Multi-standard Radio
NAS Non-Access Stratum
PDCCH Physical Downlink Control Channel
PDSCH Physical Downlink Shared Channel
PSTN Public Switched Telephone Network
PUSCH Physical Uplink Shared Channel
PUCCH Physical Uplink Control Channel
QPSK Quadrature Phase Shift Keying
RNC Radio Network Controller
RRC Radio Resource Control
RRH Remote Radio Head
RRU Remote Radio Unit
TCP Transmit Power Control
TGL Transmission Gap Length
TDD Time Division Duplex
UE User Equipment
UL Uplink
WAN Wide Area Network

The invention claimed is:

1. A method in a radio network controller, the radio network controller comprising a determining module, the determining module including one or more processors, the method comprising:
   determining, by the one or more processors, a decimation factor for a transmit power control algorithm, the transmit power control algorithm comprising a power control algorithm according to which transmit power control commands for controlling a transmit power of a wireless device are discontinuously transmitted to the wireless device by a network node, the decimation factor indicating a predefined number of slots, wherein one out of the predefined number of slots is for transmitting a transmit power control command to the wireless device;
   upon determining the decimation factor for the transmit power control algorithm, modifying, by the one or more processors, one or more parameters related to transmit power control to optimize transmit power control using the transmit power control algorithm having the determined decimation factor; and
   configuring, by the one or more processors, the network node to control the transmit power of the wireless device according to the transmit power control algorithm and the one or more modified parameters.

2. The method of claim 1, wherein modifying one or more parameters related to transmit power control to optimize transmit power control using the transmit power control algorithm having the determined decimation factor comprises:
   configuring, by the one or more processors, the network node to transmit, during radio link initialization, transmit power control commands according to a predefined pattern in consecutive slots in which transmit power control symbols are known by the wireless device to be present.

3. A method in a wireless device, comprising:
   receiving, from a network node, a transmit power control command for controlling a transmit power of the wireless device, the transmit power control command received according to a transmit power control algorithm, the transmit power control algorithm comprising a power control algorithm in which transmit power control commands for controlling the transmit power of the wireless device are discontinuously transmitted to the wireless device by the network node such that the wireless device receives the transmit power control command in one out of a predefined number of slots, the predefined number of slots indicated by a decimation factor; and
   performing one or more operations related to transmit power control to optimize the transmit power control using the transmit power control algorithm.

4. A radio network controller comprising a determining module, the determining module including one or more processors, the one or more processors configured to:
   determine a decimation factor for a transmit power control algorithm, the transmit power control algorithm comprising a power control algorithm according to which transmit power control commands for controlling a transmit power of a wireless device are discontinuously transmitted to the wireless device by a network node, the decimation factor indicating a predefined number of slots, wherein one out of the predefined number of slots is for transmitting a transmit power control command to the wireless device;
   upon determining the decimation factor for the transmit power control algorithm, modify one or more parameters related to transmit power control to optimize transmit power control using the transmit power control algorithm having the determined decimation factor; and
   configure the network node to control the transmit power of the wireless device according to the transmit power control algorithm and the one or more modified parameters.

5. The radio network controller of claim 4, wherein the one or more processors configured to modify one or more parameters related to transmit power control to optimize transmit power control using the transmit power control algorithm having the determined decimation factor comprise one or more processors configured to:
configure the network node to transmit, during radio link initialization, transmit power control commands according to a predefined pattern in consecutive slots in which transmit power control symbols are known by the wireless device to be present.

6. The radio network controller of claim 4, wherein the one or more processors configured to modify one or more parameters related to transmit power control to optimize transmit power control using the transmit power control algorithm having the determined decimation factor comprise one or more processors configured to:
configure a transmit power control step size parameter such that the transmit power control step size parameter can have a value of either 1 dB or 2 dB.

7. The radio network controller of claim 4, wherein the one or more processors configured to modify one or more parameters related to transmit power control to optimize transmit power control using the transmit power control algorithm having the determined decimation factor comprise one or more processors configured to:
configure the wireless device to receive a transmit power control command in one out of the predefined number of slots indicated by the decimation factor.

8. The radio network controller of claim 7, wherein the one or more processors are further configured to configure the wireless device to not process transmit power control commands in slots other than the one out of the predefined number of slots for which the wireless device is configured to receive a transmit power control command.

9. The radio network controller of claim 4, wherein the one or more processors are configured to:
determine that the wireless device is configured for compressed mode such that a transmission gap interrupts a radio frame communicated to the wireless device; and
apply a different transmit power control algorithm for power controlling the wireless device configured for compressed mode.

10. The radio network controller of claim 4, wherein the wireless device is a first wireless device of a subset of a plurality of wireless device, and the one or more processors are configured to:
configure each wireless device of the subset of wireless devices with one of a number of possible different non-overlapping transmit power control transmission patterns;
configure the network node to transmit a transmit power control command to the first wireless device according to the configured transmit power control transmission pattern for the first wireless device; and
configure the network node to transmit a transmit power control command to a second wireless device of the subset of wireless devices according to the configured transmit power control transmission pattern for the second wireless device, wherein the first wireless device and the second wireless device share the same Transmit Power Control symbol position and channelization code conveyed within the same Fractional-Dedicated Physical Channel (F-DPCH).

11. The radio network controller of claim 10, wherein:
the transmit power control transmission pattern comprises a different F-DPCH frame timing offset and a slot format; and
wherein the subset of the one or more wireless devices are power controlled using a transmit power control algorithm having the same decimation factor.

12. A wireless device comprising: one or more processors, the one or more processors configured to:
receive, from a network node, a transmit power control command for controlling a transmit power of the wireless device, the transmit power control command received according to a transmit power control algorithm, the transmit power control algorithm comprising a power control algorithm in which transmit power control commands for controlling the transmit power of the wireless device are discontinuously transmitted to the wireless device by the network node such that the wireless device receives the transmit power control command in one out of a predefined number of slots, the predefined number of slots indicated by a decimation factor; and
perform one or more operations related to transmit power control to optimize the transmit power control using the transmit power control algorithm.

13. The wireless device of claim 12, wherein the one or more processors configured to perform one or more operations related to transmit power control to optimize transmit power control using the transmit power control algorithm comprise one or more processors configured to:
toggle transmit power control commands sent to the network node by the wireless device to control the transmit power of the network node.

14. The wireless device of claim 13, wherein the one or more processors configured to toggle transmit power control commands sent to the network node by the wireless device to control the transmit power of the network node comprise one or more processors configured to:
generate a first transmit power control command for controlling the transmit power of the network node based on one or more measurements in the one out of the predefined number of slots in which the wireless device is configured to receive a transmit power control command; and
for each remaining slot out of the predefined number of slots in which the wireless device is configured to not receive a transmit power control command, generate additional transmit power control commands for controlling the transmit power of the network node according to one or more predefined rules.

15. The wireless device of claim 14, wherein the one or more processors configured to generate additional transmit power control commands for controlling the transmit power of the network node according to one or more predefined rules comprises one or more processors configured to:
if the decimation factor indicating the predefined number of slots comprises a decimation factor of three, generate and communicate to the network node in subsequent slots:
a second transmit power control command instructing the network node to decrease the transmit power; and
a third transmit power control command instructing the network node to increase the transmit power; and
if the decimation factor indicating the predefined number of slots comprises a decimation factor of five, generate and communicate to the network node in subsequent slots:
a second transmit power control command instructing the network node to decrease the transmit power;
a third transmit power control command instructing the network node to increase the transmit power;

a fourth transmit power control command instructing the network node to decrease the transmit power; and a fifth transmit power control command instructing the network node to increase the transmit power.

16. The wireless device of claim 12, wherein the one or more processors configured to perform one or more operations related to transmit power control to optimize transmit power control using the transmit power control algorithm comprise one or more processors configured to:

receive, during radio link initialization, transmit power control commands according to a predefined pattern in consecutive slots in which transmit power control symbols are known by the wireless device to be present.

17. The wireless device of claim 12, wherein the one or more processors configured to perform one or more operations related to transmit power control to optimize transmit power control using the transmit power control algorithm comprise one or more processors configured to:

use a transmit power control step size parameter such that the transmit power control step size parameter can have a value of either 1 dB or 2 dB.

18. The wireless device of claim 12, wherein the wireless device is configured for compressed mode such that a transmission gap interrupts a radio frame communicated to the wireless device, and the one or more processors are configured to:

receive subsequent transmit power control commands according to a different transmit power control algorithm for power controlling the wireless device configured for compressed mode.

19. The wireless device of claim 12, wherein the wireless device is a first wireless device of a subset of a plurality of wireless device, and the one or more processors are configured to:

determine a first transmit power control transmission pattern associated with the first wireless device, the first transmit power control transmission pattern comprising one of a number of possible different non-overlapping transmit power control transmission patterns that is different from a second transmit power control transmission pattern associated with a second wireless device included in the subset of the plurality of wireless devices; and receive, from the network node, a transmit power control command according to the first transmit power control transmission pattern associated with the first wireless device, wherein the first wireless device and the second wireless device share the same transmit power control symbol position and channelization code conveyed within the same Fractional-Dedicated Physical Channel (F-DPCH).

20. The wireless device of claim 19, wherein:

the first and second transmit power control transmission patterns comprise a different F-DPCH frame timing offset and a slot format; and the first wireless device and the second wireless device are power controlled using a transmit power control algorithm having the same decimation factor.

* * * * *